United States Patent
Salahieh et al.

(10) Patent No.: US 12,230,002 B2
(45) Date of Patent: Feb. 18, 2025

(54) OBJECT-BASED VOLUMETRIC VIDEO CODING

(71) Applicant: INTEL CORPORATION, Santa Clara, CA (US)

(72) Inventors: Basel Salahieh, Santa Clara, CA (US); Fai Yeung, Palo Alto, CA (US); Jill Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 17/631,301

(22) PCT Filed: Sep. 30, 2020

(86) PCT No.: PCT/US2020/053633
§ 371 (c)(1),
(2) Date: Jan. 28, 2022

(87) PCT Pub. No.: WO2021/067501
PCT Pub. Date: Apr. 8, 2021

(65) Prior Publication Data
US 2022/0262041 A1    Aug. 18, 2022

Related U.S. Application Data

(60) Provisional application No. 62/908,855, filed on Oct. 1, 2019.

(51) Int. Cl.
*H04N 19/20* (2014.01)
*G06T 9/00* (2006.01)
*G06V 10/50* (2022.01)

(52) U.S. Cl.
CPC ............... *G06T 9/00* (2013.01); *G06V 10/50* (2022.01); *H04N 19/20* (2014.11)

(58) Field of Classification Search
CPC .......... G06T 9/00; G06T 9/001; G06V 10/50; H04N 19/20; H04N 19/597
See application file for complete search history.

(56) References Cited

U.S. PATENT DOCUMENTS

2018/0108146 A1    4/2018 Zhan et al.
2019/0089943 A1*   3/2019 Yun ..................... H04N 13/117
(Continued)

FOREIGN PATENT DOCUMENTS

WO       2019110405 A1     6/2019
WO    WO-2019115866 A1 *   6/2019
WO       2021067501 A1     4/2021

OTHER PUBLICATIONS

International Searching Authority, "Written Opinion," issued in connection with application No. PCT/US2020/053633, dated Jan. 20, 2021, 5 pages.

(Continued)

*Primary Examiner* — Tat C Chio
(74) *Attorney, Agent, or Firm* — Hanley, Flight & Zimmerman, LLC

(57) ABSTRACT

Methods, apparatus, systems and articles of manufacture for object-based volumetric video coding are disclosed. An example apparatus disclosed herein includes a point annotator to receive point cloud data associated with an object and annotate points of the point cloud data with an object identifier of the object. The disclosed example apparatus also includes a projector to project the point cloud data onto projection planes to produce texture images and geometry images. The disclosed example apparatus further includes a patch generator to generate a patch based on the object identifier, the patch including the texture images and the geometry images of the object, the patch associated with the object identifier of the object. The disclosed example appa- (Continued)

ratus also includes an atlas generator to generate an atlas to include in encoded video data, the atlas including the patch.

20 Claims, 15 Drawing Sheets

(56) References Cited

U.S. PATENT DOCUMENTS

| | | |
|---|---|---|
| 2019/0156519 A1 | 5/2019 | Mammou et al. |
| 2020/0014940 A1* | 1/2020 | Dawar .................... G06T 9/001 |
| 2021/0006833 A1* | 1/2021 | Tourapis ................ H04N 19/88 |
| 2022/0239949 A1* | 7/2022 | Hannuksela ......... H04N 21/435 |

OTHER PUBLICATIONS

International Searching Authority, "International Search Report," issued in connection with application No. PCT/US2020/053633, dated Jan. 20, 2021, 4 pages.

Lopes et al., "Adaptive Plane Projection for Video-based Point Cloud Coding", Tecnico Lisboa Thesis to obtain the Master of Science Degree in Electrical and Computer Engineering, Nov. 2018.

International Searching Authority, "International Preliminary Report on Patentability," issued in connection with International Patent Application No. PCT/US2020/053633, mailed on Apr. 14, 2022, 7 pages.

* cited by examiner

US 12,230,002 B2

OBJECT-BASED VOLUMETRIC VIDEO CODING

RELATED APPLICATION

This patent arises from the U.S. stage of International Patent Application No. PCT/US2020/053633, which is titled "OBJECT-BASED VOLUMETRIC VIDEO CODING," and was filed on Sep. 30, 2020, which claims the benefit of U.S. Provisional Patent Application Ser. No. 62/908,855, which was filed on Oct. 1, 2019. International Patent Application No. PCT/US2020/053633 and U.S. Provisional Patent Application Ser. No. 62/908,855 are hereby incorporated herein by reference in their respective entireties. Priority to International Patent Application No. PCT/US2020/053633 and U.S. Provisional Patent Application Ser. No. 62/908,855 is hereby claimed.

FIELD OF THE DISCLOSURE

This disclosure relates generally to video coding, and, more particularly, to object-based volumetric video coding.

BACKGROUND

Point clouds can be used to represent three dimensional objects in space. For example, point clouds may include a set of data points that can be used to represent volumetric data that characterizes one or more properties of the three dimensional object(s) in space.

BRIEF DESCRIPTION OF THE DRAWINGS

The figures are not to scale. In general, the same reference numbers will be used throughout the drawing(s) and accompanying written description to refer to the same or like parts.

Figure 1:
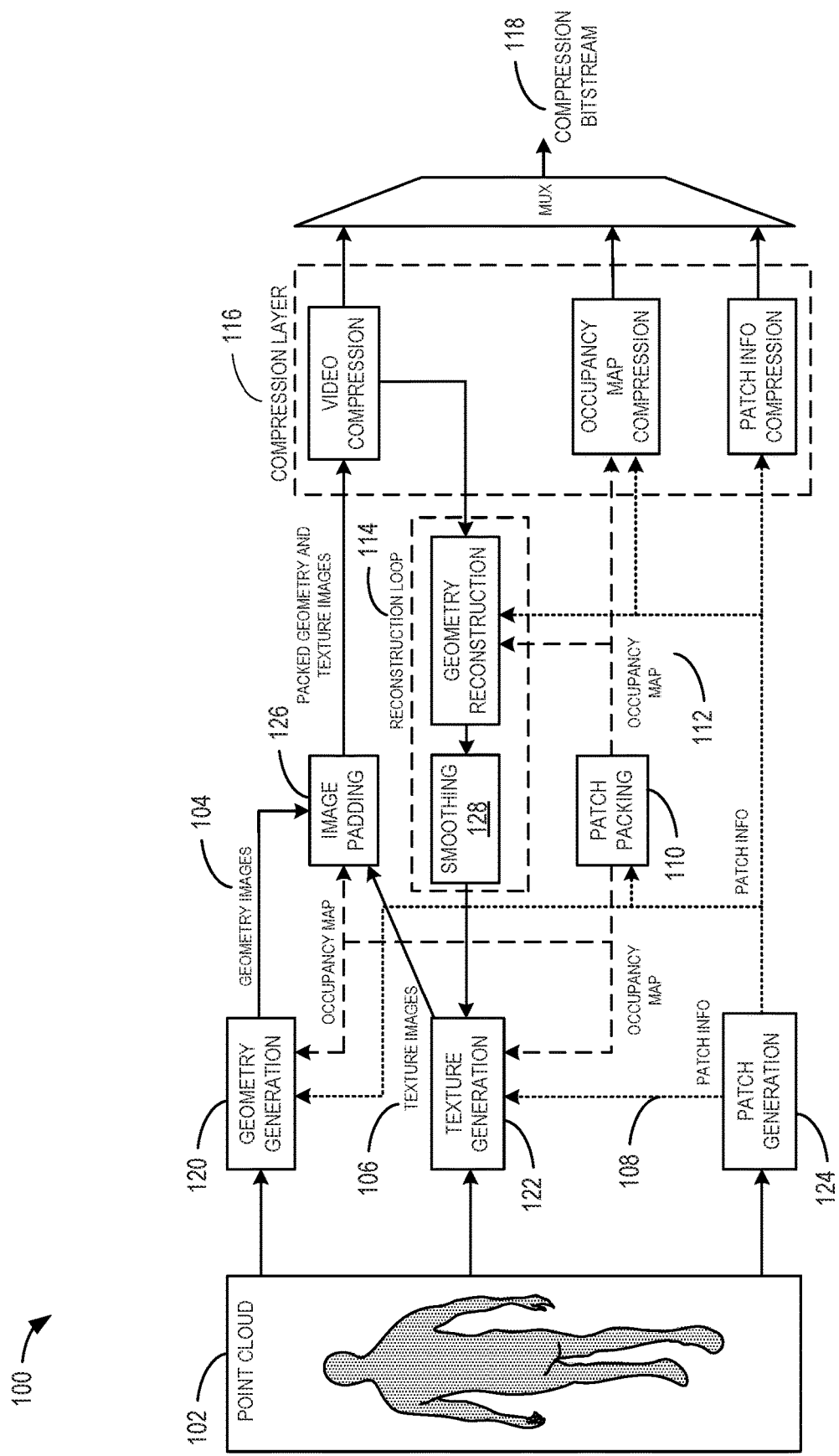
FIG. 1 illustrates a block diagram of an example system for video-based point cloud compression (V-PCC) encoding.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Advancements in digital media technology are enabling delivery of compelling immersive experiences with new media formats. The Moving Picture Experts Group (MPEG) is one standardization group that is developing standards to support immersive media access and delivery. For example, the coded representation of immersive media (MPEG-1) is a set of immersive media industry standards directed to immersive media formats, such as panoramic 360° video, volumetric point-clouds, and immersive video.

The video-based point-cloud compression (V-PCC) immersive volumetric standard, as proposed in May 2015, encodes a point-cloud sequence by projecting the point-cloud onto planar surfaces, and coding the texture and depth planar projections using existing video codec standards, such as Advanced Video Coding (AVC) or High Efficiency Video Coding (HEVC). The V-PCC draft standard includes a tile group feature that allows an atlas to be split into rectangular tiles, using a grid pattern to process the tiles in parallel.

However, the V-PCC draft standard does not include representation of objects in a video scene. As used herein, the terms "object" or "entity" are used interchangeably and refer to actors, things, properties, etc., in images. In some examples, an entity is an object captured in a scene. For example, an object can correspond to a physical object (e.g., a person, a piece of furniture, etc.) and/or a part of a physical object (e.g., a hand of a person, a head of a person, a t-shirt a person is wearing, etc.) represented in the scene. Additionally or alternatively, an object can correspond to a segmentation of the scene based on one or more aspects of the scene, such as reflectance properties, material definitions, etc. For example, an object can also be materials (e.g., skin of a person, hair of a person, grass, etc.), colors (e.g., green, blue, etc.), etc. represented in the scene. Due to the lack of support for the representation of objects in a video scene, the V-PCC draft standard does not support an enhanced, personalized, object-based six degrees of freedom (6DoF) experience. For example, in many typical setups for point-cloud acquisition and formation, the background information is captured in low fidelity settings and can be discarded. A user may overlay or otherwise merge video scene objects with a new background generated with synthetic data (e.g., a synthesized image) or formed with video textured meshes. Without the ability to separately represent point-cloud objects and backgrounds, the current specifications of industry standards do not allow separation of background from video scene objects (e.g., so new background models can be used), do not enable object filtering and processing natively, do not support network adaptive scene synthesis, do not facilitate object-based enhancement, etc.

Methods, apparatus, and systems for object-based volumetric video coding are disclosed herein. For example, techniques disclosed herein accommodate object and background representation in volumetric video coding schemes. The ability to separately represent point-cloud objects and background facilitates innovative usages of volumetric video, such as network-based scene synthesis, personalized 6DoF experience, attention-based prioritization, customized point-cloud rendering, etc.

Example techniques disclosed herein include assigning object identifiers to points of a point-cloud, wherein the points of a first object have the same object identifier, which is different from the object identifier of a second object. Disclosed example techniques also include projecting point-clouds onto orthogonal projection planes. Some disclosed example techniques project point-clouds onto orthogonal projection planes one object at a time, project point-clouds of objects onto separate projection layer pairs, and/or project point-clouds of objects onto separate projection planes. Disclosed example techniques further include generating patches from the projection planes and packing patches into canvases, with the patches each corresponding to a single object in some examples. Disclosed example techniques also include multiplexing canvases with texture data, depth data, occupancy map data, and/or metadata to generate a single encoded bitstream.

Example techniques disclosed herein include decoding an encoded bitstream into texture data, geometry data, occupancy map data, and patch data. Example techniques disclosed herein also include determining objects of interest to render. For example, the objects of interest can be determined based on image context, user preference, etc. Example techniques disclosed herein further include rendering and/or replacing objects of interest based on decoded patches.

FIG. 1 illustrates a block diagram of an example video-based point-cloud compression (V-PCC) encoding system 100, also referred to as a V-PCC encoder 100, for V-PCC encoding. The illustrated example of FIG. 1 represents the encoding process in prior techniques of V-PCC compression. The example V-PCC encoder 100 receives example dynamic point-cloud volume data 102. As used herein, a point cloud is a set of pixels in space. For example, a point cloud includes (X, Y, Z, R, G, B) data for each pixel in 3D space, where the tuple (X, Y, Z) corresponds to depth data and the tuple (R, G, B) corresponds to texture data.

The V-PCC encoder 100 receives the dynamic point-cloud data 102 as an input (e.g., per frame) and projects (represented by blocks 120 and 122 in FIG. 1) the dynamic point-cloud data 102 onto orthogonal planes (e.g., forming cubes) to generate example geometry images 104 and example texture images 106. The V-PCC encoder 100 includes existing video encoders such as AVC and HEVC to exploit the spatial and temporal redundancy of the geometry images 104 and the texture images 106 formed from the dynamic point-cloud volume data 102. In the illustrated example, each pixel of the texture images 106 is the projected color component from a corresponding point of a point-cloud (e.g., the point-cloud volume data 102) onto a projection plane and each pixel of the geometry images 104 represent the depth (e.g., distance) between the projection plane and the point-cloud. For example, the texture images 106 include red-green-blue (RGB) components. Projection planes are described in further detail in connection with FIG. 2 below.

The V-PCC encoder 100 performs segmentation at block 124 to extract example patch information 108. That is, the V-PCC encoder 100 extracts rectangular regions as patches of similar depths from each projection plane. As used herein, similar depths can be determined by one or more criteria, such as one or more thresholds, percentages, etc. For example, depending on the application, similar depths may not have a displacement greater than one foot, one inch, one millimeter etc. At the example block 110, the V-PCC encoder 100 packs the patches 108 and an example occupancy map 112 (described below) into a tiled canvas (e.g., an atlas). As used herein, an occupancy map indicates regions in the atlas that are occupied by patches. For example, the occupancy map includes a value of 1 indicating the corresponding pixel in the atlas is occupied and a value of 0 indicating the corresponding pixel in the atlas is not occupied. In some examples, the V-PCC encoder 100 generates the occupancy map. In the illustrated example, the occupancy map 112 indicates parts of the atlas that are occupied. The V-PCC encoder 100 further generates patch information metadata to indicate how patches are mapped between the projection planes and the atlas.

The V-PCC encoder 100 performs image padding (represented by block 126 in FIG. 1) after generating the geometry images 104 and the texture images 106. That is, the V-PCC encoder 100 fills in empty spaces between patches to improve the efficiency of video coding. For example, the V-PCC encoder 100 processes each block of pixels arranged in raster order and assigns the index of the patch as block metadata information. As used herein, a block is a group of one or more pixels. For example, a block can be a group of eight pixels of the point cloud. However, a block can include a greater or fewer number of pixels. In the illustrated example, the patches generated at block 110 are made of one or more blocks.

The V-PCC encoder 100 generates (represented by block 110 in FIG. 1) metadata information for each patch (e.g., patch information). In the illustrated example, the metadata information includes the index of the patch projection plane, the patch location in three-dimensional (3D) space, the patch location in the 2D projection plane, etc. The V-PCC encoder 100 predicts and arithmetically encodes the patch information. In some examples, there is a list of patches containing the same block (e.g., patch in patch case). For example, patches can overlap such that blocks of pixels can belong to one or more patches. In such examples, the patches are resolved at the decoder side by relying on the streamed occupancy maps and following the same order used to encode the patches at the V-PCC encoder 100.

The V-PCC encoder 100 generates (represented by block 110) an occupancy map. In some examples, the occupancy map is associated with an atlas (e.g., same dimensions and resolution), which may include patches from a plurality of point clouds. In the illustrated example, an occupancy map is a binary map to indicate if a cell (e.g., pixel) in a 2D grid (e.g., representative of point positions/locations in an atlas) is occupied and belongs to a patch of the point-cloud. In some examples, the occupancy map is compressed in blocks or sub-blocks with a plurality of scanning modes to achieve lossless encoding.

At the example reconstruction loop 114, the V-PCC encoder 100 simulates reconstruction of geometry information with a smoothing procedure (represented by block 128). For example, the V-PCC encoder 100 simulates the reconstruction of the geometry images 104 with a smoothing procedure to be performed in the V-PCC decoder for referencing during the encoding process. In some examples, the smoothing procedure removes discontinuities at the patch boundaries due to compression artifacts.

At the example compression layer 116, the V-PCC encoder 100 compresses the generated bitstreams. For example, the V-PCC encoder 100 compresses video bitstreams (e.g., packed geometry and texture images), the occupancy map 112, and the patch information 108. In the illustrated example, the V-PCC encoder 100 combines the video encoded streams (e.g., including encoded geometry images 104 and texture images 106), video encoded occupancy maps 112, and encoded patch information metadata 108 into a single bitstream 118.

Figure 2:
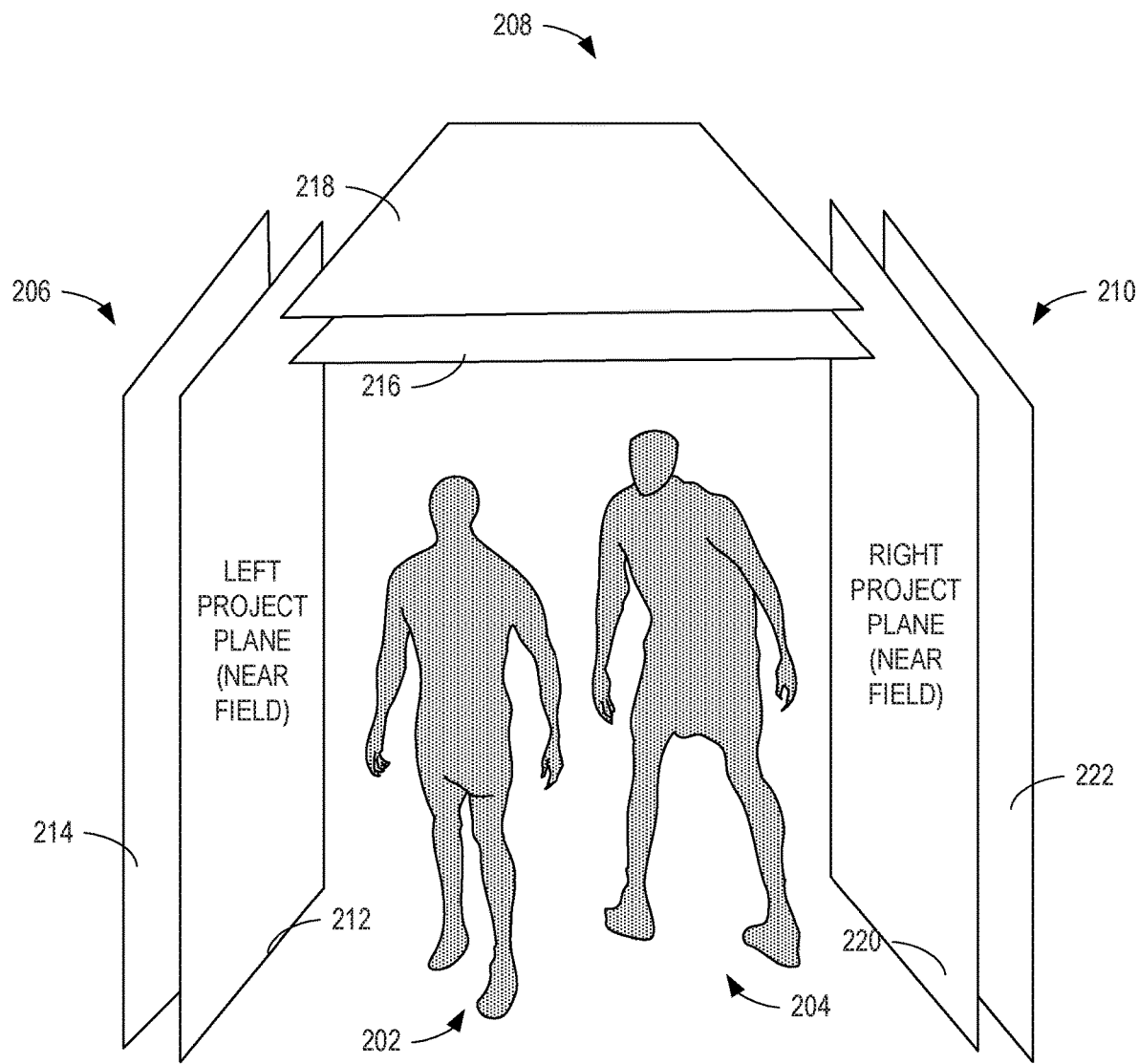
FIG. 2 illustrates example projection planes associated with point-clouds.

FIG. 2 illustrates example projection planes associated with point-clouds. The illustrated example of FIG. 2 includes a first example point-cloud 202 representative of a first object (e.g., a first object, illustrated as a first person) and a second example point-cloud 204 representative of a second object (e.g., a second object, illustrated as a second person). The illustrated example of FIG. 2 includes an example left projection plane 206, an example top projection plane 208, and an example right projection plane 210. In some examples, the example projection planes 206, 208, 210 are part of a projection cube, which further includes a bottom projection plane, a back projection plane, and a front projection plane not shown in FIG. 2.

In examples disclosed herein, point-clouds (e.g., the point-clouds 202, 204) are coded using orthogonal projections of texture and geometry (e.g., the geometry images 104 and the texture images 106 of FIG. 1) onto planes (e.g., the projection planes 206, 208, 210) representing a bounding rectangular solid. Patches are formed from the 3D surfaces and mapped to a particular projection plane based on whichever plane has the closest normal distance to the surface area for the patch. The patches are packed into atlases (e.g., canvases).

In examples disclosed herein, the projection planes 206, 208, 210 include project layers, in some examples, the projection planes include a near layer and a far layer. For example, the left projection plane 206 includes an example near layer 212 and an example far layer 214, the top projection plane 208 includes an example near layer 216 and an example far layer 218, and the right projection plane 210 includes an example near layer 220 and an example far layer 222. In some examples, for each projection plane (e.g., the projection planes 206, 208, 210), two images are created with one corresponding to a near layer (e.g., the near layers 212, 216, 220) and the other corresponding to a far layer (e.g., the far layers 214, 218, 222). In some examples, the use of near and far layers addresses examples in which more than one point of the point clouds is mapped to the same pixel position in the planar projection (e.g., overlapping points of the same point cloud, overlapping points of multiple point clouds, etc.). In some examples, the V-PCC encoder 100 (FIG. 1) codes both the near layer and far layer, only the near layer, etc.

Figure 3:
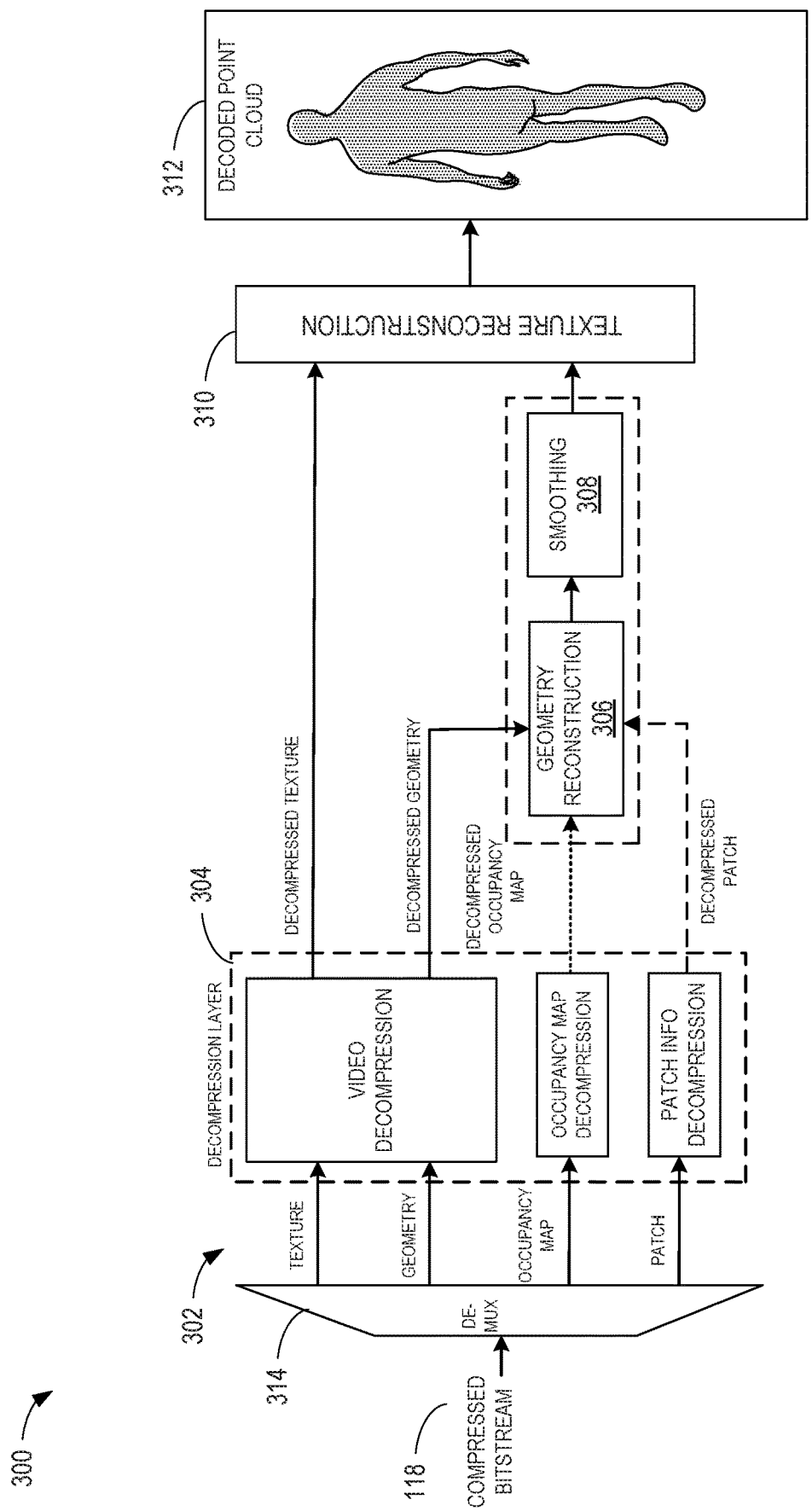
FIG. 3 illustrates a block diagram of an example system for V-PCC decoding.

FIG. 3 illustrates a block diagram of an example V-PCC decoding system 300, also referred to as a V-PCC decoder 300, for V-PCC decoding. The V-PCC decoder 300 receives the compressed bitstream 118 (FIG. 1), generated by the V-PCC encoder 100. The V-PCC decoder 300 demultiplexes (represented by block 314) the compressed bitstream 118 to generate example data 302 including texture bitstreams, geometry bitstreams, occupancy map bitstreams, and patch bitstreams, as shown. At the example decompression layer 304, the V-PCC decoder 300 decompresses the data 302 (e.g., the texture bitstream, the geometry bitstream, the occupancy map bitstream, and/or the patch bitstream). For example, the V-PCC decoder 300 decompresses the texture and geometry bitstreams of the data 302, in the illustrated example, the V-PCC decoder 300 decompresses the texture and geometry bitstreams using a video decoder matched with the video encoder used by the V-PCC encoder 100.

At block 306, the V-PCC decoder 300 performs geometry reconstruction. For example, the V-PCC decoder 300 generates reconstructed geometry data based on the decompressed geometry bitstream, the decompressed occupancy map bitstream, and the decompressed patch bitstream. At block 308, the V-PCC decoder 300 performs smoothing on the reconstructed geometry information. At block 310, the V-PCC decoder 300 venerates a decoded dynamic point-cloud 312 using the smoothed reconstructed geometry information to map the texture video.

Figure 4:
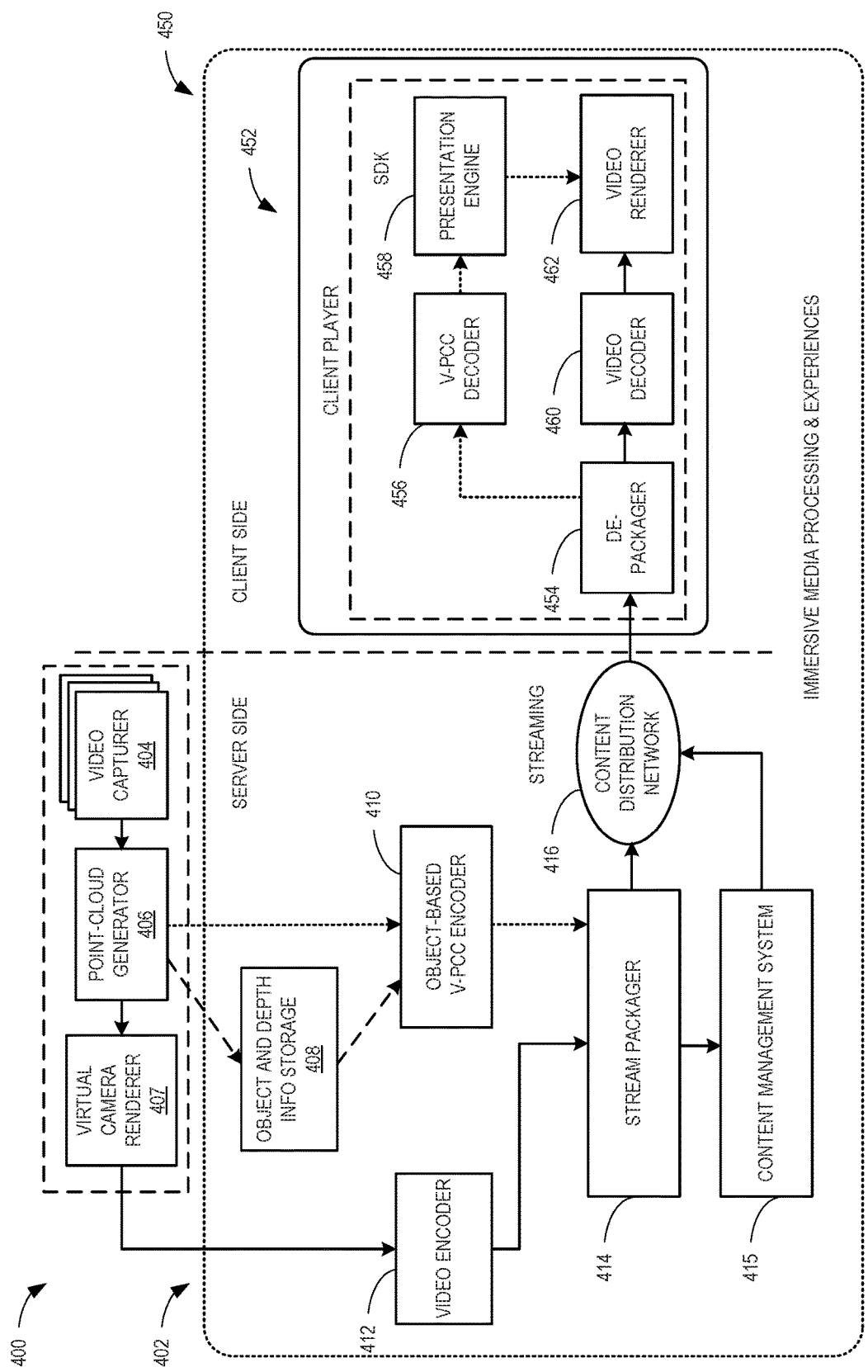
FIG. 4 illustrates a block diagram of an example object-based volumetric video coding system implemented in accordance with teachings of this disclosure.

FIG. 4 illustrates a block diagram of an example object-based volumetric video coding system 400 implemented in accordance with teachings of this disclosure. The example object-based volumetric video coding system 400 includes an example server side immersive video encoding system 402 and an example client side immersive video decoding system 450. The example server side immersive video encoding system 402 includes one or more example video capturers 404, an example point-cloud generator 406, an example virtual camera renderer 407, example object and depth information storage 408, an example object-based V-PCC encoder 410, an example video encoder 412, an example stream packager 414, an example content management system 415, and an example content distribution network 416.

The example video capturer(s) 404 capture image data. For example, the video capturer(s) 404 can include and/or interface with an image sensor (e.g., a camera) to capture frames of images. Additionally or alternatively, the example video capturer(s) 404 can implement Lidar imaging. The point-cloud generator 406, transforms the data obtained from the example video capturer(s) 404 (e.g., frames) into point-clouds (e.g., the point-cloud 102 of FIG. 1). The object and depth information storage 408 and/or the example object-based V-PCC encoder 410 receives the point-cloud data.

The point-cloud generator 406 generates example object and depth information (e.g., stored in the object and depth information storage 408) to include in the point-cloud data. In some examples, the point-cloud generator 406 generates object identifiers (e.g. object IDs) for each point of the point-cloud data. For example, the point-cloud generator 406 uses a machine-learning classifier, a conventional classifier, and/or a segmentation algorithm to analyze points of the point-cloud to (i) identify one or more different objects represented in the point-cloud and (ii) assign an object ID to each point. That is, points of the point-cloud belonging to the same object will have the same object ID. Additionally or alternatively, the example video capturer(s) 404 can capture and assign an object ID to individual point-cloud objects separately and then populate the objects in the same scene. In some examples, the object IDs are provided by a computer-generated graphics program. That is, object IDs can be assigned to objects during graphics generation. For example, a video game can generate a video labeled with object identifiers (e.g., the video game provides object identifiers for each object in a video sequence).

In examples disclosed herein, the point-clouds generated by the point-cloud generator 406 include texture data, geometry data, and object identifiers. In some examples, each data point of a point-cloud can include values for an (X, Y, Z, R, G, B, attributes) tuple. For example, the (X, Y, Z) values represent the geometry (e.g., location) of a point in the point-cloud with respect to a reference 3D global coordinate system (e.g., having 3 orthogonal dimensions labeled the X, Y and Z dimensions). The (R, G, B) values represents texture components (e.g., 3 color components, such as red, green and blue color components) of the point in the point-cloud. The value(s) of the 'attributes' field represents at least the object identifier of the corresponding object the point represents.

In examples disclosed herein, the object ID identifies a point-cloud object so that there are no duplicated object IDs for different point-cloud objects in a scene within a finite time period. In some examples, the number of bits needed to represent the object ID depend on the number of objects supported in the object-based volumetric video coding system 400. For example, the number of bits to encode object identifiers can have a fixed length or a variable length depending on the maximum number of objects in a scene. For example, the object ID can be represented by a byte, with the last bit reserved to indicate an extension. In some such examples, the extendibility of the object ID is to support usages with a large number (e.g., thousands) of possible point-cloud objects. For example, if the images captured by the video capturer(s) 404 include six objects, the attributes field of the point-cloud data triple may include at least three bits to store the six object IDs. As another example, if the images captured by the video capturer(s) 404 include 20,000 objects, the attributes field of the point-cloud data may include at least 16 bits to store 20,000 object IDs. In some examples, the number of bits included in the attributes field changes based on the number of objects in a scene, thereby reducing the number of unused bits.

The example object-based V-PCC encoder 410 receives point-cloud data (e.g., generated by the point-cloud generator 406) and/or object and depth information (e.g., stored in the object and depth information storage 408). The object-based V-PCC encoder 410 performs object-based encoding of the point-cloud data. For example, the object-based V-PCC encoder 410 projects the point-cloud data onto projection planes (e.g., a projection cube) and generates patches. In examples disclosed herein, the object-based V-PCC encoder 410 generates patches that are associated with a singular object. The object-based V-PCC encoder 410 packs the generated patches in atlases.

The object-based V-PCC encoder 410 enables object-based encoding. For example, the object-based V-PCC encoder 410 tags point-cloud objects and the background of the scene with different object identifiers. In some examples, the object identifiers enable object-based scalability for adaptive streaming over different network conditions. For example, the object-based V-PCC encoder 410 of the illustrated example determines objects of interest and/or relative importance of each object of a scene based on contextual information. For example, the object-based V-PCC encoder 410 identifies a ball of a sports game as an object of interest, a plate of a cooking competition as an object of interest, etc. The example object-based V-PCC encoder 410 determines whether patches corresponding to point-cloud objects not of interest (e.g., background objects, etc.) can be entirely dropped (e.g., not encoded) or encoded at a lower visual quality. This allows the object-based V-PCC encoder 410 to allocate relatively more bandwidth to encode objects of interest instead of distributing equal bandwidth to all objects of the scene.

The example object-based. V-PCC encoder 410 can also identify objects of interest based on user attention. That is, the object-based V-PCC encoder 410 analyzes actions of objects to determine if the object is of interest. For example, in a sports game, the object-based V-PCC encoder 410 analyzes the motion of a ball (e.g., an object's depth information over a time period) to determine where the action is and captures activity around the ball (e.g., determine object identifiers corresponding to players within a threshold distance from the ball). In some examples, the object-based V-PCC encoder 410 determines the objects within a threshold distance from an action (e.g., the moving ball) are objects of interest and, thus, allocates a higher bit budget (e.g., a higher resolution) to the patches of the objects of interest. This allows a user of the client side immersive video decoding system 450 to zoom into the higher resolution patches and generate a high fidelity rendering of the object of interest. An example implementation of the object-based V-PCC encoder 410 is described below in conjunction with FIG. 5.

The example virtual camera renderer 407 processes the point cloud data generated by the point-cloud generator 406. For example, the virtual camera renderer 407 renders an environment scene based on the point cloud data. For example, the virtual camera renderer 407 renders supplemental information with respect to the point cloud data generated by the point-cloud generator 406.

The example video encoder 412 performs video encoding. For example, the video encoder 412 encodes frames captured from virtual cameras (e.g., 360° videos) in separate channels to support backward compatibility. That is, the example video encoder 412 encodes data compatible with decoders that do not support V-PCC (e.g., the consumer device at the client side immersive video decoding system 450 does not support a V-PCC decoder). In some examples, the server side immersive video encoding system 402 does not include the virtual camera rendering 407 and/or the video encoder 412.

The example stream packager 414 combines the encoded bitstreams together. That is, the example stream packager 414 produces a multiplexed bitstream. For example, the stream packager 414 combines the encoded bitstream of the object-based V-PCC encoder 410 and the encoded bitstream of the video encoder 412. In some examples, the stream packager 414 adds metadata indicating various assets in the scene. For example, the stream packager 414 adds data indicating the frame rate of the encoded bitstream, the resolution of the encoded bitstream, the amount of bandwidth available, etc.

The example content management system 415 controls imaging modalities streamed to the client side immersive video decoding system 450. For example, the server side immersive video encoding system 402 generates view from different modalities of imaging (e.g., point cloud images, 360° video, etc.) capturing the same scene. The content management system 415 determines whether to selects subsets of the modalities. For example, if a user is not viewing 360° content, the content management system 415 extracts viewport corresponding to the viewer position and orientation.

The example content distribution network 416 is a network used to transmit the multiplexed bitstream to the example client side immersive video decoding system 450. In some examples, the content distribution network 416 can be the Internet or any other suitable external network. Additionally or alternatively, any other suitable means of transmitting the multiplexed bitstream to the client side immersive video decoding system 450 can be used.

The example client side immersive video decoding system 450 includes an example client player 452. In the illustrated example of FIG. 4, the client player 452 includes an example de-packager 454, an example V-PCC decoder 456, an example presentation engine 458, an example video decoder 460, and an example video renderer 462.

The example de-packager 454 demultiplexes the multiplexed bitstream. That is, the example de-packager 454 receives the multiplexed bitstream from the example server side 402 via the example content distribution network 416 and demultiplexes the bitstream to generate substreams (e.g., the video bitstream, the V-PCC bitstream, etc.).

The example V-PCC decoder 456 decodes the V-PCC bitstream. For example, the V-PCC decoder 456 decompresses occupancy map bitstreams and/or patch bitstreams to reconstruct geometry data. Additionally or alternatively, the V-PCC decoder 456 performs smoothing on the reconstructed geometry data and generates a decoded dynamic point-cloud. An example implementation of the V-PCC decoder 456 is described below in conjunction with FIG. 6.

The example presentation engine 458 maps the decoded atlases and metadata generated by the object-based V-PCC encoder 410 to the projection format of the client player 452. For example, the presentation engine 458 reconstructs the source views. For example, the presentation engine 458 reconstructs the source views based on the projection format (e.g., rectangular projection, perspective projection, orthographic projection, etc.).

The example video decoder 460 decodes the video bitstream. For example, the video decoder 460 decompresses the texture and geometry bitstreams. In some examples, the video decoder 460 matches the video encoder 412 (e.g., uses the same video coding format).

The example video renderer 462 generates viewport (e.g., volumetric) content. For example, the video renderer 462 receives the reconstructed source views from the presentation engine 458 and the decoded video bitstream from the video decoder 460 and generates volumetric content (e.g., the example decoded point-cloud 312 of FIG. 3). The volumetric content is displayed to a user of the client player 452. In some examples, the video renderer 462 filters and renders volumetric content based on object identifiers of the reconstructed source views.

For example, the V-PCC decoder 456 can filter out objects based on bounding box attributes of point-cloud objects. That is, the example client player 452 and, thus, the example V-PCC decoder 456 receives bitstream data (e.g., texture data, geometry data, object identifiers, etc.) corresponding to an entire scene. However, the example V-PCC decoder 456 can identify objects of interest (e.g., player of interest in sports game, etc.). Thus, the V-PCC decoder 456 identifies the corresponding object identifier of the object of interest and the video renderer 462 can be configured to render the patches corresponding to the object identifiers of interest but not render patch(es) corresponding to one or more other objects in the scene. This allows for a personalized experience for users of the client player 452 to select content of interest (e.g., render only one team's players of a sports game, render only offensive players of a sports game, etc.).

The example video renderer 462 allows for user customization of the rendered video. That is, a user of the client player 452 can customize objects and/or the background of a scene. For example, based on user input, a client application, etc., the video renderer 462 can use object identifiers provided by the V-PCC decoder 456 to replace one or more objects in a scene with other image data. (e.g., render customized advertisement banner on the wall of a sports stadium, render a synthetic background, change the color of a shirt, etc.).

In some examples, the video renderer 462 determines an order of rendering. For example, the video renderer 462 selects one or more objects of a scene to render first (e.g., objects relatively closer to the user's perspective). The example video renderer 462 can render additional objects (e.g., background objects, static objects, etc.) at a relatively later time (e.g., corresponding to the last intra-frame). In such examples, the example client player 452 saves compute and bandwidth resources, improving real-time rendering of objects of interest.

Figure 5:
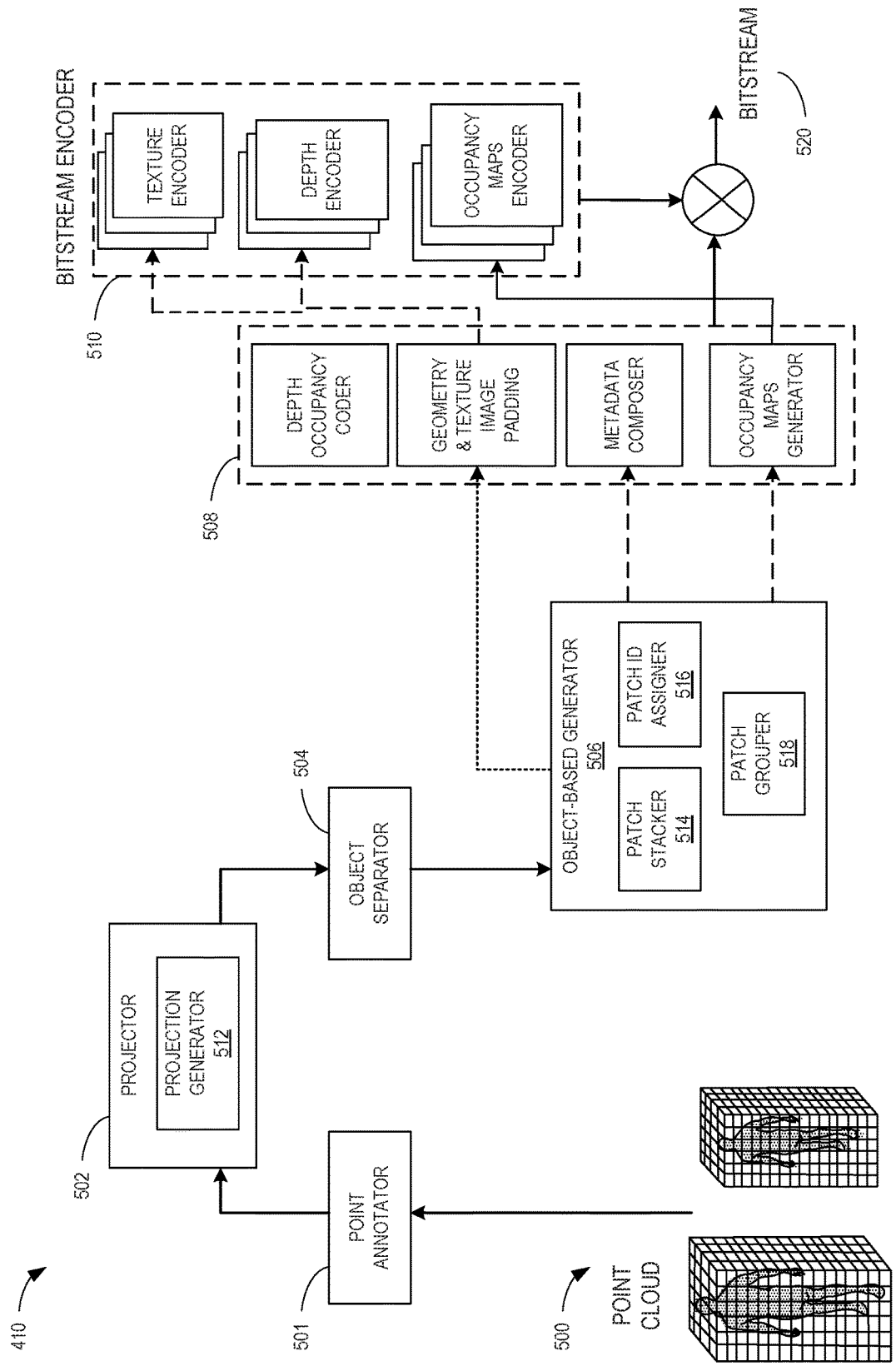
FIG. 5 illustrates a block diagram of an example implementation of the object-based V-PCC encoder included in the example object-based volumetric video coding system of FIG. 4.

FIG. 5 illustrates a block diagram of an example implementation of the object-based V-PCC encoder 410 included in the example object-based volumetric video coding system 400 of FIG. 4. The example object-based V-PCC encoder 410 includes an example point annotator 501, an example projector 502, an example object separator 504, an example object-based generator 506, an example metadata generator 508, and an example bitstream encoder 510.

The example object-based V-PCC encoder 410 receives point-cloud data 500. In the illustrated example of FIG. 5, the point-cloud data 500 includes three objects: a background, a first person, and a second person. As described above, each point of the point-cloud data includes (X, Y, Z, R, G, B, O) data, where the triple (X, Y, Z) corresponds to depth data, the triple (R, G, B) corresponds to texture data, and the attributes field, represented by 'O', corresponds to object data. The object data includes one or more object identifiers to uniquely identify the corresponding one or more objects in the scene. In the illustrated example, the background corresponds to the object identifier of 0, the first person corresponds to the object identifier of 1, and the second person corresponds to the object identifier of 2.

The example point annotator 501 determines if the point-cloud data includes object IDs. For example, the attribute data of the point-cloud data 500 may not include object IDs. If the point annotator 501 determines the point-cloud data does not include object IDs, the point annotator 501 annotates points of the point-cloud data 500 with object IDs as described above. For example, the point annotator 501 uses a machine-learning classifier to identify different objects in the point-cloud data 500. Additionally or alternatively, the point annotator 501 determines the point-cloud data 500 includes object IDs. In some examples, the object IDs are provided by a computer-generated graphics program. For example, a video game can generate a video (e.g., including the point-cloud data 500) labeled with object identifiers (e.g., the video game provides object identifiers for each object in a video sequence).

As illustrated in Table 1 below, the num_objects data element can be added in a data structure (e.g., atlas_tile_group_data_unit) that defines an atlas. As shown in Table 2, the object ID for a given object can be included with a corresponding data structure defining the per patch information for that object, such as a data structure that defines patch parameters. The object ID value can be signaled in several ways. For example, u(v) coding can be used as shown in Table 2, with the number of bits used to represent a given object being equal to ceil(log 2(num_objects)). The ceil(n) function returns the smallest possible integer value which is greater than or equal to the input, n. For example, ceil(2.8) returns the integer 3. The log 2(x) function returns the base-2 logarithm of the input, x. For example, log 2(2) returns the value 1.

TABLE 1

| | Descriptor |
|---|---|
| atlas_tile_group_data_unit( ) { | |
|   num_objects | u(16) |
|   p = 0 | |
|   atgdu_patch_mode[ p ] | ue(v) |
|   while (atgdu_patch_mode[ p ] != I_END | |
|   && atgdu_patch_mode[ p ] != P_END){ | |
|     patch_information_data (p, atgdu_patch_mode [ p ] | |
|     p++ | |
|     atgdu_patch_mode [ p ] | ue(v) |
|   } | |
|   AtgduTotalNUnberOfPatches = p | |
|   byte_alignment( ) | |
| } | |

TABLE 2

| | Descriptor |
|---|---|
| patch_information_data ( patchIndex, patch_mode) ( ) { | |
|   object_id | u(v) |
|   if(patch_mode = = P_SKIP ) | |
|     skip_patch_data_unit( patchIndex ) | |
|   else if(patch_mode = = P_MERGE ) | |
|     merge_patch_data_unit( patchIndex ) | |
|   else if(patch_mode = = I_INTRA \|\| patch_mode = = P_INTRA) | |
|     patch_data_unit( patchIndex ) | |
|   else if( patch_mode = = P_INTER) | |
|     inter_patch_data_unit( patchIndex ) | |
|   else if(patch_mode = = I_RAW \|\| patch_mode = = P_RAW ) | |
|     raw_patch_data_unit( patchIndex ) | |
| } | |

Additionally or alternatively, the example point annotator 501 assigns a respective bounding box to enclose each corresponding point-cloud object. For example, the depth data of an object (e.g., the X, Y, Z component of the point-cloud data 500) is bound within the bounding box. The placement of the bounding box relates the location of a point-cloud object to a reference 3D global coordinate system. In some examples, the bounding box is associated with the object ID. In examples disclosed herein, a remote client (e.g., the client side immersive video decoding system 450) can use bounding box information to construct the scene with point-cloud objects, label the objects, and render an end user's viewport.

The attributes of a bounding box represent the localization information as well as supplementary information of the point-cloud object. The example point annotator 501 determines the geometry of the bounding box by specifying a starting point. For example, the bounding box can have a starting point art the top, left, front corner (x, y, z) with dimensions (w, h, d), where w refers to the width of the bounding box with respect to the starting point, h refers to the height of the bounding box with respect to the starting point, and d refers to the depth of the bounding box with respect to the starting point. In some examples, the localization information is stored as floating point values.

In some examples, the point annotator 501 stores the localization information and/or the supplementary information of the bounding box as a Supplementary Enhancement Information (SEI) message in a compressed point-cloud video bitstream. Bounding boxes can be signaled by the example point annotator 501 within an SEI message. For a volumetric media application, the bounding box can be extended to three dimensions (3D) such that the SEI metadata indicates a rectangular cube per object. Additionally or alternatively, the SEI message can list the object labels (e.g., object IDs), where each SEI message can be used by multiple objects. The object labels are indicated by a data structure (e.g., ar_label[ar_label_idx[i]]) within the SEI message, as illustrated below in Table 3,

TABLE 3

| | Descriptor |
|---|---|
| annotated regions( payloadSize ) { | |
|   ar_cancel_flag | u(1) |
|   if (!ar_cancel_flag) { | |
|     ar_not_optimized_for_viewing_flag | u(1) |
|     ar_true_motion_flag | u(1) |
|     ar_occluded_object_flag | u(1) |
|     ar_partial_object_flag_present_flag | u(1) |
|     ar_object_label_present_flag | u(1) |
|     ar_object_confidence_info_present_flag | u(1) |
|     if( ar_object_confidence_info_present_flag ) | |
|       ar_object_confidence_length_minus1 | u(4) |
|     if( ar_object_label_present_flag) { | |
|       ar_object_label_language_present_flag | u(1) |
|       if( ar_object_label_language_present_flag ) { | |
|         while( !byte_aligned( ) ) | |
|           ar_bit_equal_to_zero /* equal to 0 */ | f(1) |
|         ar_object_label_language | st(v) |
|       } | |
|       ar_num_label_updates | ue(v) |
|       for( i = 0; i < ar_num_label_updates; i++ ) { | |
|         ar_label_idx[ i ] | ue(v) |
|         ar_label_cancel_flag | u(1) |
|         LabelAssigned[ ar_label_idx[ i] ] = !ar_label_cancel_flag | |
|         if ( !ar_label_cancel_flag) { | |
|           while( !byte aligned( ) ) | |
|             ar_bit_equal_to_zero /* equal to 0 */ | f(1) |
|           ar_label[ ar_label_idx[ i ] ] | st(v) |
|         } | |
|       } | |
|     } | |
|     ar_nums_object_updates | ue(v) |
|     for( i = 0; i <= ar_num_object_updates; i++ ) { | |
|       ar_object_idx[ i ] | ue(v) |
|       ar_object_cancel_flag | u(1) |
|       ObjectTracked[ ar_object_idx[ i ] ] = !ar_object_cancel_flag | |
|       if (!ar_object_cancel_flag) { | |
|         if( ar_object_label_present_flag ) { | |
|           ar_object_label_update_flag | u(1) |
|           if( ar_object_label_update_flag ) | |
|             ar_object_label_idx[ ar_object_idx[ i ] ] | ue(v) |
|         } | |
|         ar_bounding_box_update_flag | u(1) |
|         if( ar_bounding_box_update_flag { | |
|           ar_bounding_box_cancel_flag | u(1) |
|           ObjectBoundingBoxAvail[ ar_object_idx[ | |

TABLE 3-continued

| | Descriptor |
|---|---|
| i ] ] | |
| = !ar_bounding_box_cancel_flag | |
| if (!ar bounding box cancel flag) { | |
| ar_bounding_box_top[ ar_object_idx[ i ] ] | u(16) |
| ar_bounding_box_left[ ar_object_idx[ i ] ] | u(16) |
| ar_bounding_box_front[ ar_object_idx[ i ] ] | u(16) |
| ar_bounding_box_width[ ar_object_idx[ i ] ] | u(16) |
| ar_bounding_box_height[ ar_object_idx[ i ] ] | u(16) |
| ar_bounding_box_depth[ ar_object_idx[ i ] ] | u(16) |
| if( ar_partial_object_flag_present_flag ) | |
| ar_partial_object_flag[ ar_object_idx[ i ] ] | u(1) |
| if( ar_object_confidence_info_present_flag ) | |
| ar_object_confidence[ ar_object_idx[ i ] ] | u(v) |
| } | |
| } | |
| } | |
| } | |
| } | |
| } | |
| } | |

Examples of at least some of the SEI data elements listed in Table 3 can be found in the "Proposed Revision to Annotated Regions SEI Message for HEVC and Inclusion in AVC", JCTVC-AK0025, released October 2019. Example of the SEI data elements that are added/modified in accordance with teachings of this disclosure are defined herein as follows. The data element ar_object_idx[i] is the index of object parameters (e.g. bounding box, label) to be signaled and indicates the object ID of the related patches. The data elements ar_bounding_box_top[ ], ar_bounding_box_left[ ], ar_bounding_box_front[ ], ar_bounding_box_width[ ], ar_bounding_box_height[ ], and ar_bounding_box_depth[ ] specify the coordinates of the top-left-front corner and the width, height, and depth, respectively, of the 3D bounding box of the ith object (identified by ar_object_idx[i]) relative to the 3D reference coordinate system (e.g., the same coordinate system that projection planes are referenced to).

In some examples disclosed herein, each entity is associated with a bounding box to efficiently be identified, labeled, localized, processed, and rendered directly rather than accessing all pixels across atlases and/or patches. For example, the system 400 can treat background data (e.g., floors, walls, etc.) and/or background-related elements (e.g., advertisement banners, basketball net, etc.) as special point-cloud objects inferred from the entity IDs associated with bounding boxes that represent their respective anchoring positions and attributes. In some examples, the point-cloud data corresponding to a background (e.g., floor, stadium, audience seating areas, etc.) is captured and constructed at a low fidelity, such as when the background point-cloud data is reconstructed from a plurality of cameras. However, example techniques disclosed herein segment the point-cloud data to separate the background entity from other objects of interest in the point-cloud data. In such examples, the V-PCC decoder 456 can replace the background with a synthetic high-quality model, video textured meshes, live video feed, etc.

For example, if the background objects are static in nature (e.g., they do not change between frames of point-cloud data), the object-based V-PCC encoder 410 can send background objects ahead of time (e.g., before a live streamlining of a game, etc.) and the V-PCC decoder 456 can retrieve the background objects using the corresponding object ID later. In some examples, the object-based V-PCC encoder 410 sends the background objects once per intra-period between entry points of compression bitstream if needed.

Additionally or alternatively, the background objects can include additional objects. For example, the background of a sports game can be a stadium including audience members. In such examples, the bounding box associated with the background object can be linked to its underlying live video stream and the V-PCC decoder 456 can render the background object as a synthetic stadium model.

The example projector 502 projects the point-cloud data 500 onto projection planes to form geometry and texture views along with object maps. In examples disclosed herein, the projector 502 segments and projects the point-cloud data 500 onto orthogonal projection planes. In some examples, the orthogonal projection planes form a projection cube with six planes (e.g., a top plane, a bottom plane, a left plane, a right plane, a front plane, and a back plane). However, other projection plane geometries can additionally or alternatively be used (e.g., a pyramid, etc.). As described above, the projection planes can include projection layer pairs (e.g., a near layer and a far layer).

In some examples, the projector 502 projects the point-cloud data of one object at a time onto projection planes. That is, the projector 502 iterates through each object identifier and, for a given iteration, projects only the point-cloud data of the selected object identifier onto the projection planes. However, iterating through one object at a time can be computationally time consuming.

In some examples, the projector 502 projects the point-cloud data 500 onto the projection planes. That is, the projector 502 projects the point-cloud data 500 of the three objects onto the projection planes. The example object separator 504 generates a plurality of views (e.g., texture and geometry data) corresponding to different projection layers based on the associated object maps. That is, each layer is associated with only one object. In examples disclosed herein, the object separator 504 generates layers based on object identifiers.

In some examples, the object separator 504 separates the projections of point-cloud data of each object onto projection planes of a different projection layer pair such that the example projector 502 can project point-cloud data of a plurality of objects concurrently. In order to separate objects, the object separator 504 separates and assigns objects to different projection layer pairs. The ordering of projection layer pairs represents the distance of the object from the projection surface, such that the projection layer pair of a closer object is ordered before that of a further object. For example, the object separator 504 assigns the projection of the background onto a first projection layer pair, the object separator 504 assigns the projection of the first person onto a second projection layer pair, and the object separator 504 assigns the projection of the second person onto a third projection layer pair. Thus, each projection layer pair includes data of only one object. In such examples, the object separator 504 generates 6×n number of projection layer pairs, wherein n is the number of objects in the scene, and 6 corresponds to the number of projection planes of the projection cube. However, 6 can be replaced with any other number corresponding to the projection geometry (e.g., 5 for a pyramid, etc.). An illustrated example of object-based projection layer pairs is described further below in connection with FIG. 7.

In some examples, the example projector 502 includes an example projection generator 512 to perform object-specific projection. That is, the example projection generator 512 projects point-cloud data of each object onto separate projection planes (e.g., separate projection cubes). For example, each object of the point-cloud data can be associated with its own projection planes. In some examples, the projection cubes have the same resolution. Additionally or alternatively, the projection cubes can have different resolutions. For example, an object of interest can be projected onto projection planes of a projection cube at a higher resolution than an object not of interest. For example, by selecting the point-cloud data associated with the object ID of the first person, the projection generator 512 can project the point-cloud data of the first person onto a first set of projection planes (e.g., a first projection cube associated with the object ID of the first person). Additionally or alternatively, the projector 502 selects the point-cloud data associated with the object ID of the second person and projects the point-cloud data of the second person onto a second set of projection planes (e.g., a second projection cube associated with the object ID of the second person). In such examples, the object specific projection cubes are referenced to the same 3D global coordinate system. In some examples, the projector 502 performs object-based projection (e.g., located and sized) to increase the resolution and fidelity of patches of an object of interest. Thus, the patches generated from each point-cloud object are stored in separate atlases and canvases indexed by the object ID.

The example object-based generator 506 (e.g., a patch generator 506) generates patches based on the projection layers. The example object-based generator 506 includes an example patch stacker 514, an example patch ID assigner 516, and an example patch grouper 518. For example, the object-based generator 506 segments the projection layers into patches (e.g., rectangular regions) for each projection plane. The patches include texture data and geometry data. The object-based generator 506 packs the patches into a tiled canvas (e.g., an atlas). The object-based generator 506 further generates patch information metadata to indicate how patches are mapped between the projection planes and the canvas.

The object-based generator 506 generates patches in which each patch has content from a single object. Thus, each patch includes and/or is tagged with the corresponding object ID. However, the object-based generator 506 can pack patches corresponding to multiple objects into one canvas. For example, if the object separator 504 generated projection layer pairs corresponding to one object, the object-based generator 506 can generate patches of the object based on only the corresponding projection layer pairs for that object. Similarly, if the projector 502 projected point-cloud data of each object onto separate projection cubes, the object-based generator 506 can generate patches of the object based on only the projection planes of the corresponding projection cube for that object.

The object-based generator 506 additionally or alternatively generates stacked patches. That is, the patch stacker 514 generates stacked patches in projection layers (e.g., in the near projection layer, in the far projection layer, etc.) of the projection planes. In such examples, each patch represents the projection from one point-cloud object. In some examples, there are patches from different objects at the same lattice location (e.g., same coordinates) in a projection layer. Thus, the example patch stacker 514 stacks the patches such that the ordering of the stacked patches determines the proximity of the object to the surface of the projection layer (e.g., the first patch in a stack represents an object that is closer to the surface of the projection layer than the further object). For example, the projector 502 projects attribute data, geometry data, and/or object maps onto projection planes (e.g., projection layer pairs). The example patch stacker 514 generates a stack of patches included in the near layer of a projection plane based on the object maps (e.g., object IDs). Additionally or alternatively, the patch stacker 514 generates a stack of patches included in the far layer of the projection plane based on the object maps. The patch stacker 514 packs stacked patches separately in atlases such that no patch is overwriting another patch.

The example patch ID assigner 516 tags the generated patches with the corresponding object ID of the object represented in the patch. For example, a patch including the first person of the point-cloud data 500 is tagged with the object ID of the first person and a patch including the second person of the point-cloud data 500 is tagged with the object ID of the second person. The example patch grouper 518 groups patches with the same object ID together.

The example metadata generator 508 generates metadata corresponding to the patches of the canvases. For example, the metadata generator 508 generates an occupancy map. For example, the occupancy map indicates portions of the canvas that should be decoded (e.g., occupied regions within the patches packed into the canvas). The metadata generator 508 can additionally or alternatively perform geometry and texture image padding, depth occupancy coding, etc.

The example bitstream encoder 510 encodes data. For example, the bitstream encoder 510 encodes the occupancy map generated by the metadata generator 508, encodes depth data, encodes texture data, etc. The bitstream encoder 510 multiplexes the encoded data and the canvases to generate an example compressed bitstream 520.

Figure 6:
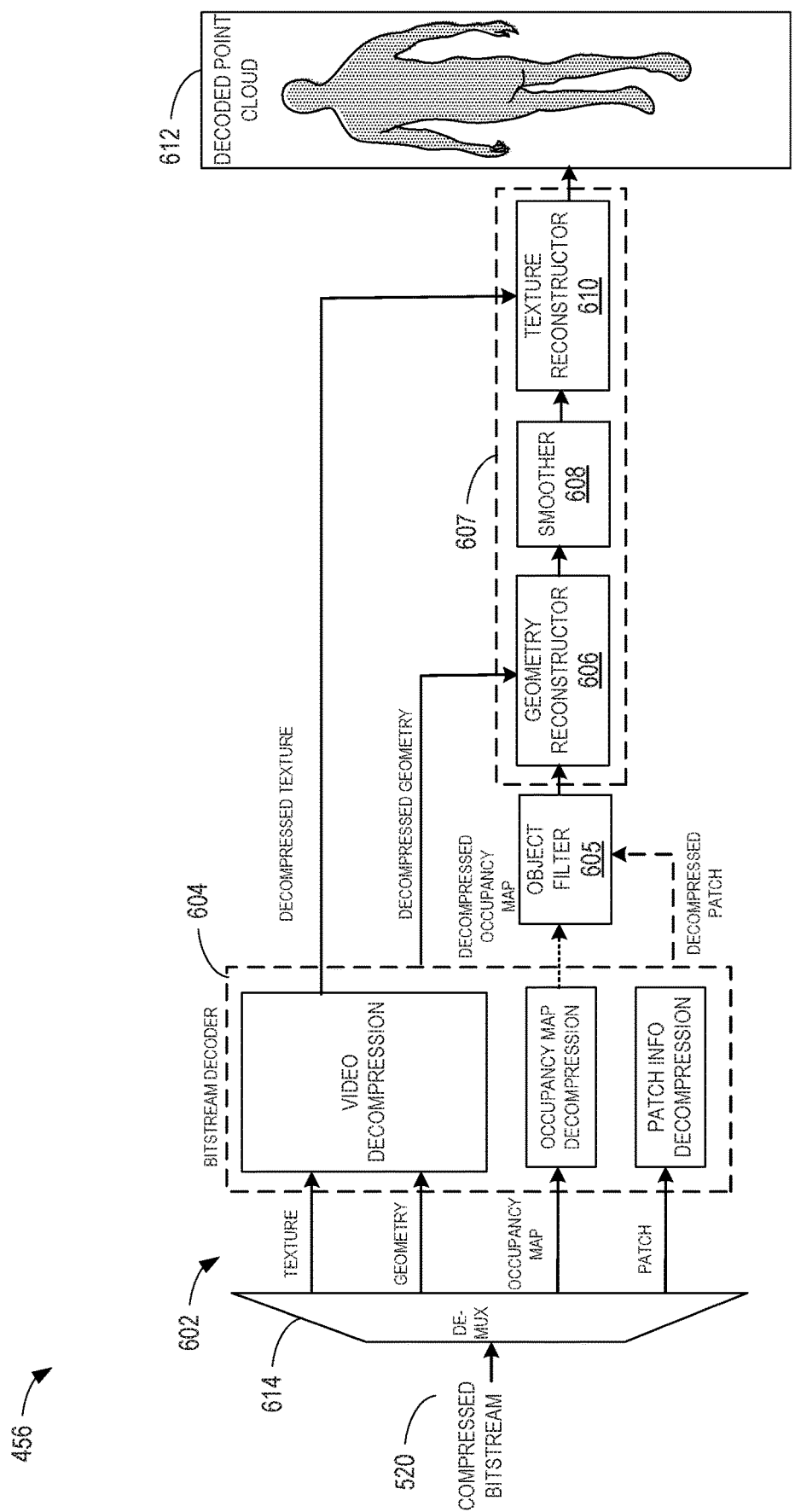
FIG. 6 illustrates a block diagram of an example implementation of the V-PCC decoder included in the example object-based volumetric video coding system of FIG. 4.

FIG. 6 illustrates a block diagram of an example implementation of the V-PCC decoder 456 included in the example client side immersive video decoding system 450 of FIG. 4. The V-PCC decoder 456 receives the compressed bitstream 520 (FIG. 5), generated by the server side volumetric video encoding system 402. The V-PCC decoder 456 demultiplexes (represented by block 614) the compressed bitstream 520 to generate example data 602 including texture bitstreams, geometry bitstreams, occupancy map bitstreams, and patch bitstreams, as shown. At the example bitstream decoder 604, the V-PCC decoder 456 decompresses the data 602 (e.g., the texture bitstream, the geometry bitstream, the occupancy map bitstream, and/or the patch bitstream). For example, the V-PCC decoder 356 decompresses the texture and geometry bitstreams of the data 602. In the illustrated example, the V-PCC decoder 356 decompresses the texture and geometry bitstreams using a video decoder matched with the video encoder used by the server side volumetric video encoding system 402.

The example V-PCC decoder 356 includes an example object filter 605 and an example reconstructor 607. The example object filter 605 receives the decompressed patch data and/or the decompressed occupancy map data. The example object filter 605 filters blocks of the patch data based on the occupancy map. For example, the object filter 605 determines which pixels of the patch data to render based on whether corresponding pixels of the occupancy map are occupied (e.g., the occupied pixels of the occupancy map correspond to objects that are to be rendered). In some examples, the object filter 605 identifies the associated bounding box using the object ID of the selected object. That is, the object filter 605 performs object filtering. For example, the object filter 605 removes patches of the objects to be filtered out from the atlas data. For example, the object filter 605 removes patches associated with the object ID, thereby generating filtered patch data. For example, the object filter 605 identifies the object IDs of the objects to be removed and removes the patches corresponding to the identified object IDs. In some examples, the object filter 507 removes the patch by removing the blocks that form the patch.

The example reconstructor 607 includes an example geometry reconstructor 606, an example smoother 608, and an example texture reconstructor 610. The example geometry reconstructor 606 performs geometry reconstruction. For example, the geometry reconstructor 606 generates reconstructed geometry data based on the decompressed geometry bitstream, the decompressed occupancy map bitstream, and the remaining patches (e.g., after the object filter 605 removes patches). The example smoother 608 performs smoothing on the reconstructed geometry information. The example texture reconstructor 610 performs texture reconstruction. For example, the texture reconstructor 610 generates reconstructed texture data based on the decompressed texture bitstream and the smoothed geometry information. The V-PCC decoder 456 generates a decoded dynamic point-cloud 612 using the smoothed reconstructed geometry information to map the reconstructed texture data. In examples disclosed herein, the decoded dynamic point-cloud 612 is the filtered output. That is, the V-PCC decoder 456 (e.g., the object filter 605) identifies objects of interest and removes patches corresponding to object IDs that are not of interest. Thus, the V-PCC decoder 456 generates the decoded dynamic point-cloud 612 based on the remaining patches.

Figure 7:
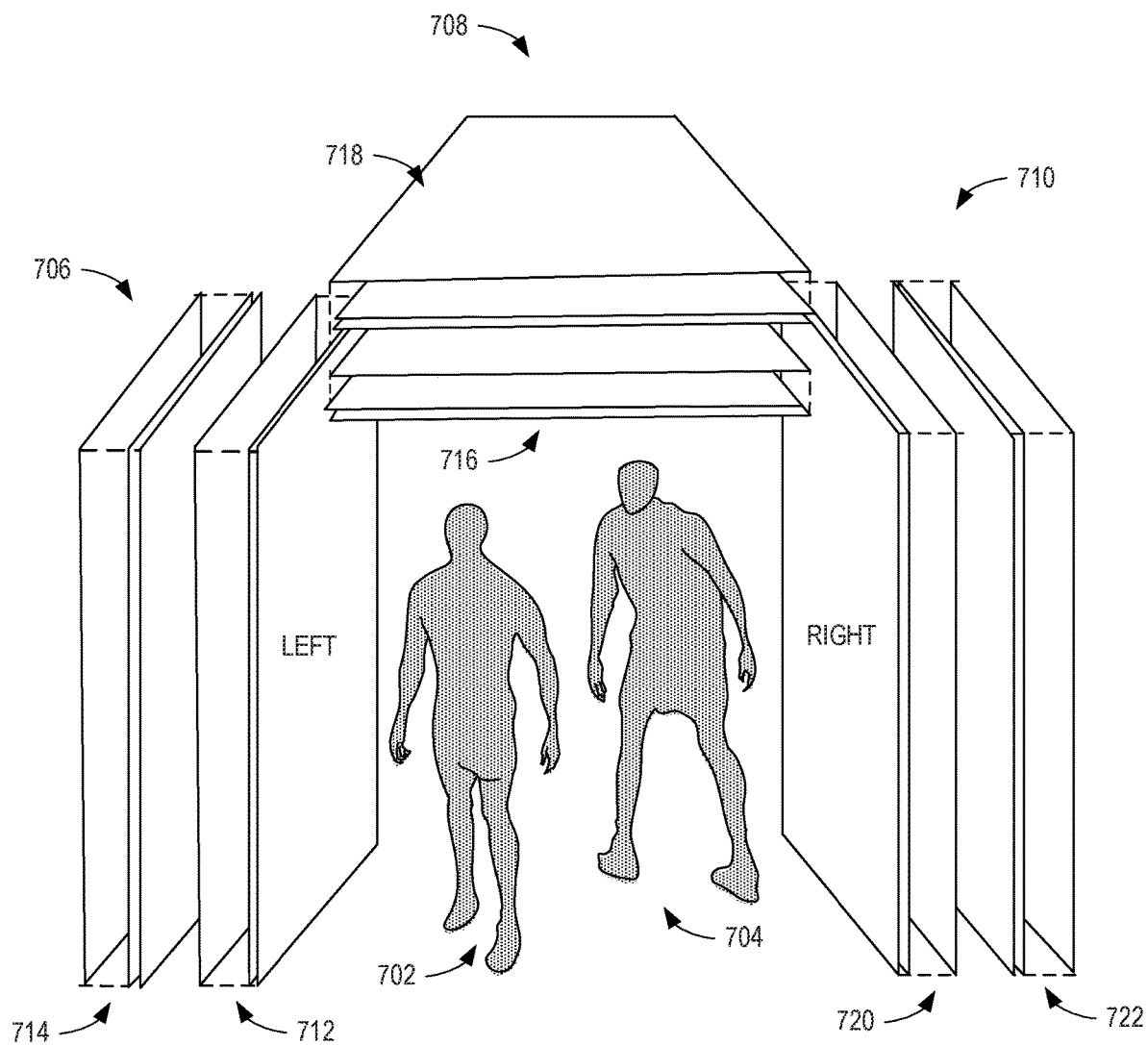
FIG. 7 illustrates example projection layer pairs associated with point-clouds.

FIG. 7 illustrates example projection layer pairs associated with point-clouds. The illustrated example of FIG. 7 includes a first example point-cloud 702 and a second example point-cloud 704 representative of a first and second person, respectively. The illustrated example of FIG. 7 includes an example left projection plane 706, an example top projection plane 708, and an example right projection plane 710. The example projection planes 706, 708, 710 are part of a projection cube (not illustrated). That is, the bottom projection plane, the back projection plane, and the front projection plane of the projection cube are not illustrated.

In the illustrated example of FIG. 7, the projection planes 706, 708, 710 include object-specific projection layer pairs. For example, the left projection plane 706 includes example near projection layers 712 and example far projection layers 714, the top projection plane 708 includes example near projection layers 716 and example far projection layers 718, and the right projection plane 710 includes example near projection layers 720 and example far projection layers 722. In examples disclosed herein, the number of near projection layers 712, 716, 720 and far projection layers 714, 718, 722 correspond to the number of objects. For example, each of the projection planes 706, 708, 710 can include three projection layer pairs in which the object separator 504 assigns one projection layer pair to the background, one projection layer pair to the first person (e.g., the first point-cloud 702), and one projection layer pair to the second person (e.g., the second point-cloud 704), respectively.

For example, the object separator 504 identifies the object ID of the background, separates the projection layer corresponding to the identified object ID into a first projection layer pair, and tags the first projection layer pair with the object ID of the background. Additionally or alternatively, the object separator 504 identifies the object ID of the first person (e.g., the point cloud 702), separates the projection layer corresponding to the identified object ID into a second projection layer pair, and tags the second projection layer pair with the object ID of the first person. Additionally or alternatively, the object separator 504 identifies the object ID of the second person (e.g., the point cloud 704), separates the projection layer corresponding to the identified object ID into a third projection layer pair, and tags the third projection layer pair with the object ID of the second person.

Figure 8:
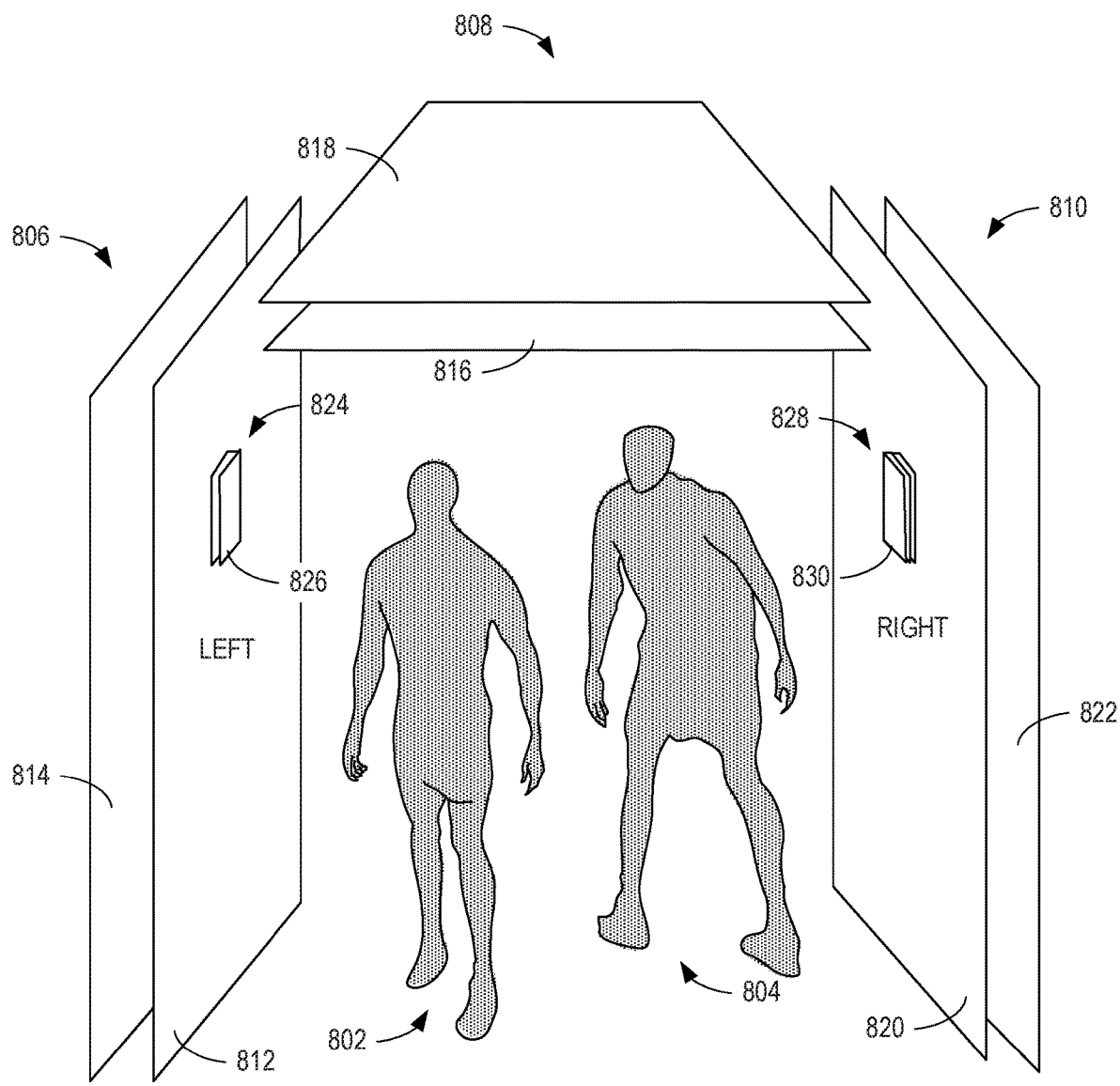
FIG. 8 illustrates example patch stacks of example near and far projection layers associated with point-clouds.

FIG. 8 illustrates example patch stacks of example near and far projection layers associated with point-clouds. The illustrated example of FIG. 8 includes a first example point-cloud 802 and a second example point-cloud 804 representative of a first and second person, respectively. The illustrated example of FIG. 8 includes an example left projection plane 806, an example top projection plane 808, and an example right projection plane 810. The example projection planes 806, 808, 810 are part of a projection cube (not illustrated). That is, the bottom projection plane, the back projection plane, and the front projection plane of the projection cube are not illustrated.

In the illustrated example of FIG. 8, the projection planes 806, 808, 810 include projection layers. For example, the left projection plane 806 includes an example near projection layer 812 and an example far projection layer 814, the top projection plane 808 includes an example near projection layer 816 and an example far projection layer 818, and the right projection plane 810 includes an example near projection layer 820 and an example far projection layer 822. The example patch stacker 514 generates an example left stack of patches 824 in the near projection layer 812 of the left projection plane 806. For example, an example first patch 826 in the left stack of patches 824 can correspond to the point-cloud 802. Thus, the example patch ID assigner 516 assigns the first patch 826 with the object ID of the first person (e.g., the point-cloud 802). Additionally or alternatively, the example patch stacker 514 generates an example right stack of patches 828 in the near projection layer 820 of the right projection plane 810. For example, an example first patch 830 in the right stack of patches 828 can correspond to the point-cloud 804. Thus, the example patch ID assigner 516 assigns the first patch 830 with the object ID of the second person (e.g., the point-cloud 804).

Figure 9:
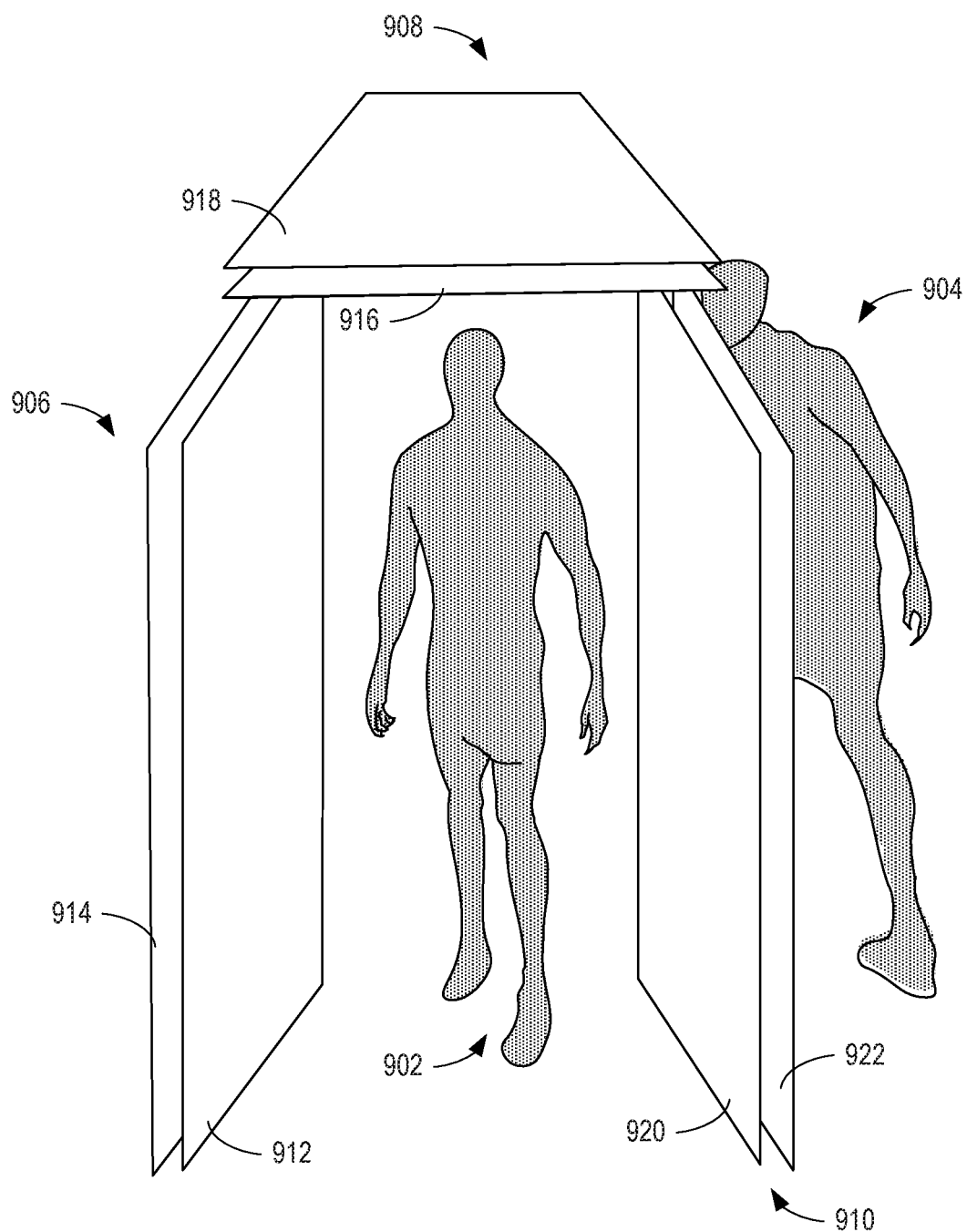
FIG. 9 illustrates example projection planes associated with a point-cloud of a first object.

FIG. 9 illustrates example projection planes associated with a point-cloud of a first object. The illustrated example of FIG. 9 includes a first example point-cloud 902 and a second example point-cloud 904 representative of a first and second person. The illustrated example of FIG. 9 includes an example left projection plane 906, an example top projection plane 908, and an example right projection plane 910. The example projection planes 906, 908, 910 are part of a projection cube (not illustrated). That is, the bottom projection plane, the back projection plane, and the front projection plane of the projection cube are not illustrated.

In the illustrated example of FIG. 9, the projection planes 906, 908, 910 include projection layers. For example, the left projection plane 906 includes an example near projection layer 912 and an example far projection layer 914, the top projection plane 908 includes an example near projection layer 916 and an example far projection layer 918, and the right projection plane 910 includes an example near projection layer 920 and an example far projection layer 922.

In the illustrated example of FIG. 9, the projection planes 906, 908, 910 are part of a projection cube associated with the first point-cloud 902. That is, the example projection generator 512 (FIG. 5) projects the first point-cloud 902 onto a first projection cube (e.g., including the projection planes 906, 908, 910) and projects the second point-cloud 904 onto a second projection cube (not illustrated). Thus, the example projection generator 512 does not project the point-cloud 904 onto the projection planes 906, 908, 910. For example, the projection generator 512 identifies the object ID of the first point cloud 902 (e.g., the object ID of the first person) and projects the point cloud associated with the object ID of the first person onto the first projection cube. Additionally or alternatively, the projection generator 512 identifies the object ID of the second point cloud 904 (e.g., the object ID of the second person) and projects the point cloud associated with the object ID of the second person onto the second projection cube.

Figure 10A:
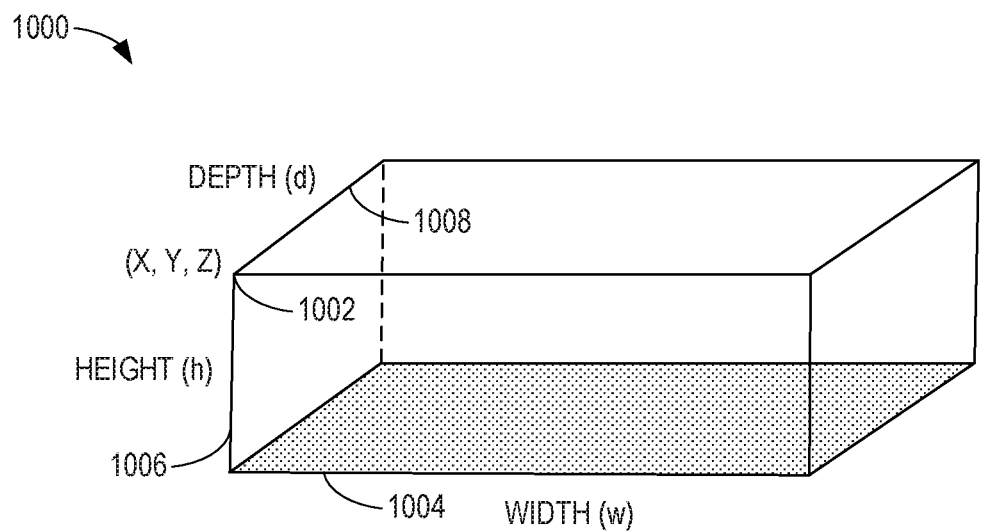
FIG. 10A illustrates an example bounding box.

FIG. 10A illustrates an example bounding box 1000. In examples disclosed herein, the bounding box 1000 is associated with a point-cloud (not illustrated). The geometry of the bounding box 1000 is specified by a starting point 1002. In the illustrated example of FIG. 10A, the starting point 1002 corresponds to the coordinates (x, y, z). The bounding box 1000 has an example width (w) 1004, an example height (h) 1006, and an example depth (d) 1008. That is, the width 1004, the height 1006, and the depth 1008 are measured with respect to the starting point 1002. In some examples, the width 1004, the height 1006, and the depth 1008 are represented in floating point values.

Figure 10B:
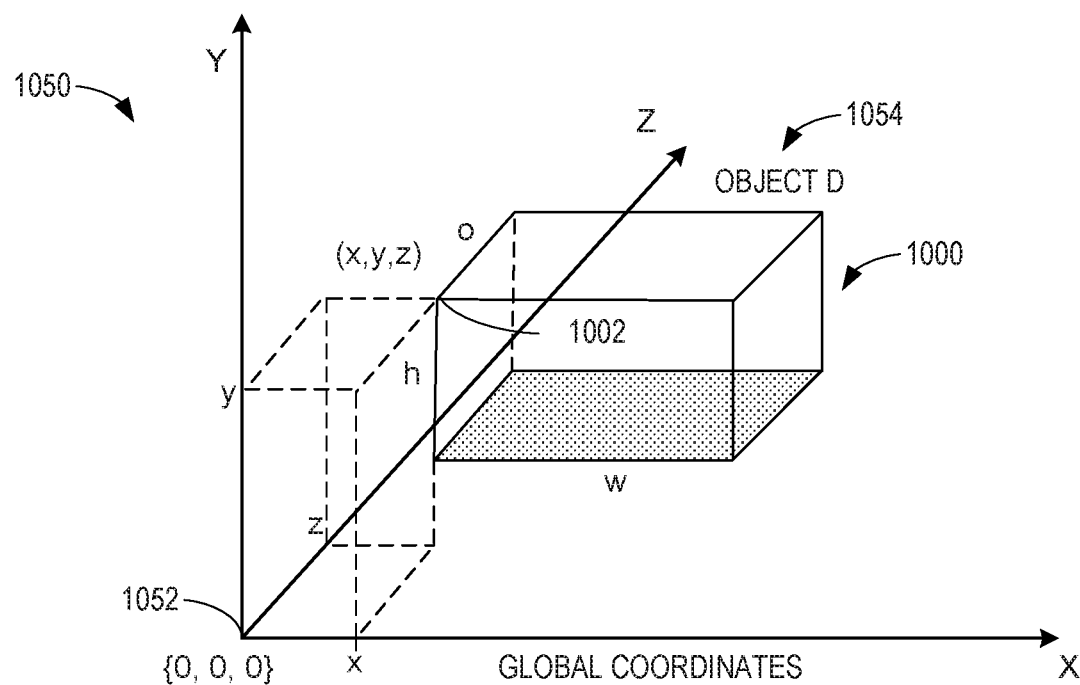
FIG. 10B illustrates the example bounding box of FIG. 10A and an example global coordinate system.

FIG. 10B illustrates the example bounding box 1000 of FIG. 10A and an example global coordinates system 1050. In the illustrated example of FIG. 10B, the starting point 1002 is determined with respect to the origin 1052 of the global coordinates system 1050. For example, the origin 1052 is (0, 0, 0). Thus, the bounding box 1000 provides the position of the enclosed point-cloud (not illustrated) with respect to the global coordinates system 1050. In the illustrated example of FIG. 10B, the bounding box 1000 includes an example object ID 1054. That is, the bounding box 1000 includes SEI information, which includes the example object ID 1054. For example, each bounding box can be associated with one object and, thus, be tagged with the object ID.

While an example manner of implementing the server side immersive video encoding system 402 of FIG. 4 is illustrated in FIG. 5, one or more of the elements, processes and/or devices illustrated in FIG. 5 may be combined, divided, re-arranged, omitted, eliminated and/or implemented in any other way. Further, the example video capturer(s) 404, the example point-cloud generator 406, the example virtual camera renderer 407, the example object and depth information storage 408, the example object-based V-PCC encoder 410, the example video encoder 412, the example stream packager 414, the example content management system 415, the example content distribution network 416, the example projector 502, the example object separator 504, the example object-based generator 506, the example metadata generator 508, the example bitstream encoder 510 and/or, more generally, the example server side immersive video encoding system 402 of FIG. 4 may be implemented by hardware, software, firmware and/or any combination of hardware, software and/or firmware. Thus, for example, any of the example video capturer(s) 404, the example point-cloud generator 406, the example virtual camera renderer 407, the example object and depth information storage 408, the example object-based V-PCC encoder 410, the example video encoder 412, the example stream packager 414, the example content management system 415, the example content distribution network 416, the example projector 502, the example object separator 504, the example object-based generator 506, the example metadata generator 508, the example bitstream encoder 510 and/or, more generally, the example server side immersive video encoding system 402 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, video capturer(s) 404, the example point-cloud generator 406, the example virtual camera renderer 407, the example object and depth information storage 408, the example object-based. V-PCC encoder 410, the example video encoder 412, the example stream packager 414, the example content management system 415, the example content distribution network 416, the example projector 502, the example object separator 504, the example object-based generator 506, the example metadata generator 508, the example bitstream encoder 510 and/or the example server side immersive video encoding system 402 is/are hereby expressly defined to include a non-transitory computer readable storage device or storage disk such as a memory, a digital versatile disk (DVD), a compact disk (CD), a Blu-ray disk, etc. including the software and/or firmware. Further still, the example server side immersive video encoding system 402 of FIG. 4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the client side immersive video decoding system 450 of FIG. 4 is illustrated in FIG. 6, one or more of the elements, processes and/or devices illustrated in FIG. 6 may be combined, divided, re-arranged, omitted, eliminated and/or implemented in any other way. Further, the example de-packager 454, the example V-PCC decoder 456, the example presentation engine 458, the example video decoder 460, the example video renderer 462, the example bitstream decoder 604, the example object filter 605, the example reconstructor 607, the example geometry reconstructor 606, the example smoother 608, the example texture reconstructor 610 and/or, more generally, the example client side immersive video decoding system 450 of FIG. 4 may be implemented by hardware, software, firmware and/or any combination of hardware, software and/or firmware. Thus, for example, any of the example de-packager 454, the example V-PCC decoder 456, the example presentation engine 458, the example video decoder 460, the example video renderer 462, the example bitstream decoder 604, the example object filter 605, the example reconstructor 607, the example geometry reconstructor 606, the example smoother 608, the example texture reconstructor 610 and/or, more generally, the example client side immersive video decoding system 450 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, de-packager 454, the example V-PCC decoder 456, the example presentation engine 458, the example video decoder 460, the example video renderer 462, the example bitstream decoder 604, the example object filter 605, the example reconstructor 607, the example geometry reconstructor 606, the example smoother 608, the example texture reconstructor 610 and/or the example client side immersive video decoding system 450 is/are hereby expressly defined to include a non-transitory computer readable storage device or storage disk such as a memory, a digital versatile disk (DVD), a compact disk (CD), a Blu-ray disk, etc. including the software and/or firmware. Further still, the example client side immersive video decoding system 450 of FIG. 4 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
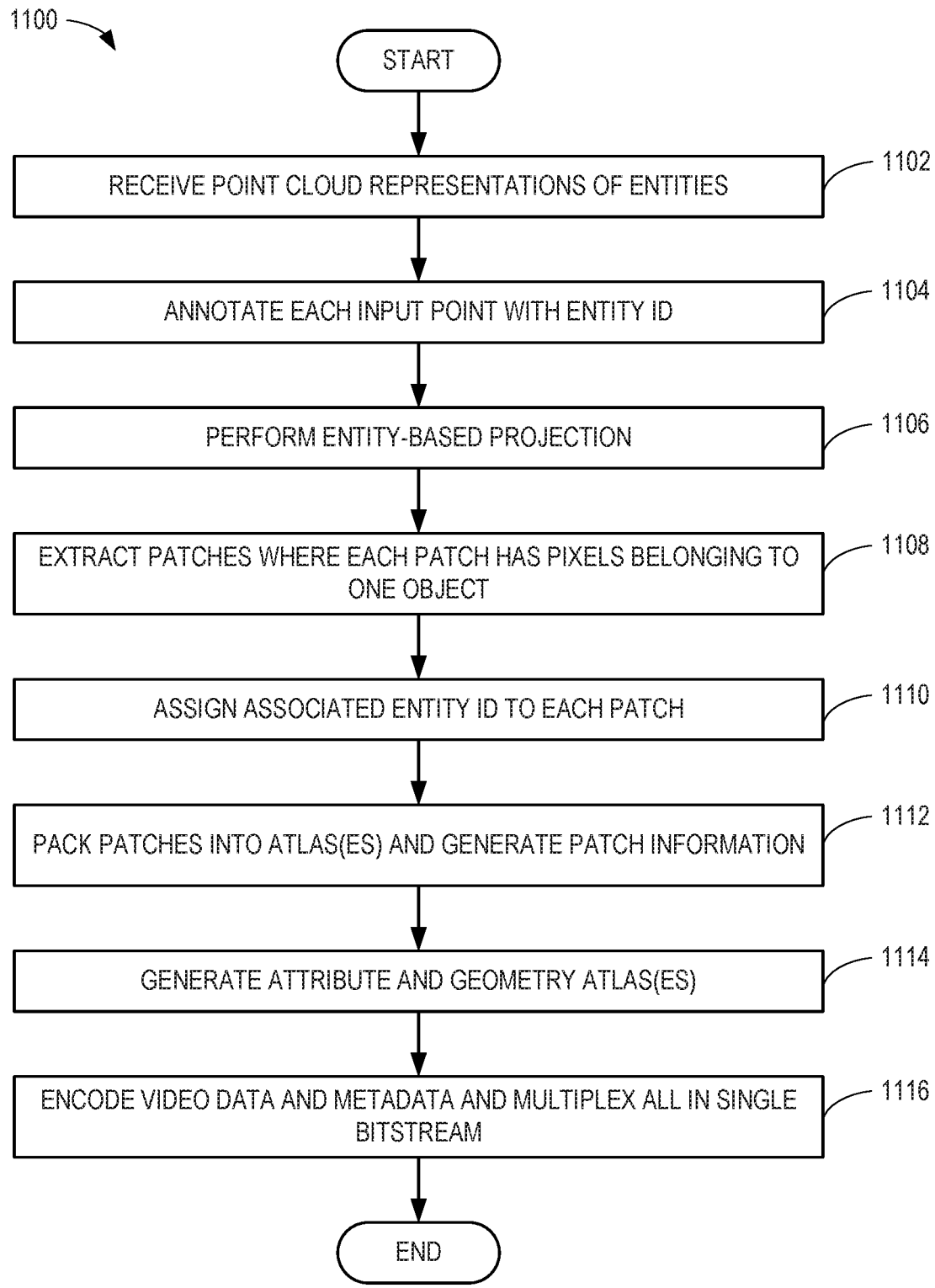
FIG. 11 is a flowchart representative of machine readable instructions which may be executed to implement the object-based V-PCC encoder of FIGS. 4 and/or 5.

A flowchart representative of example hardware logic, machine readable instructions, hardware implemented state machines, and/or any combination thereof for implementing the server side immersive video encoding system 402 of FIG. 4 is shown in FIG. 11. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 11, many other methods of implementing the example server side immersive video encoding system 402 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 12:
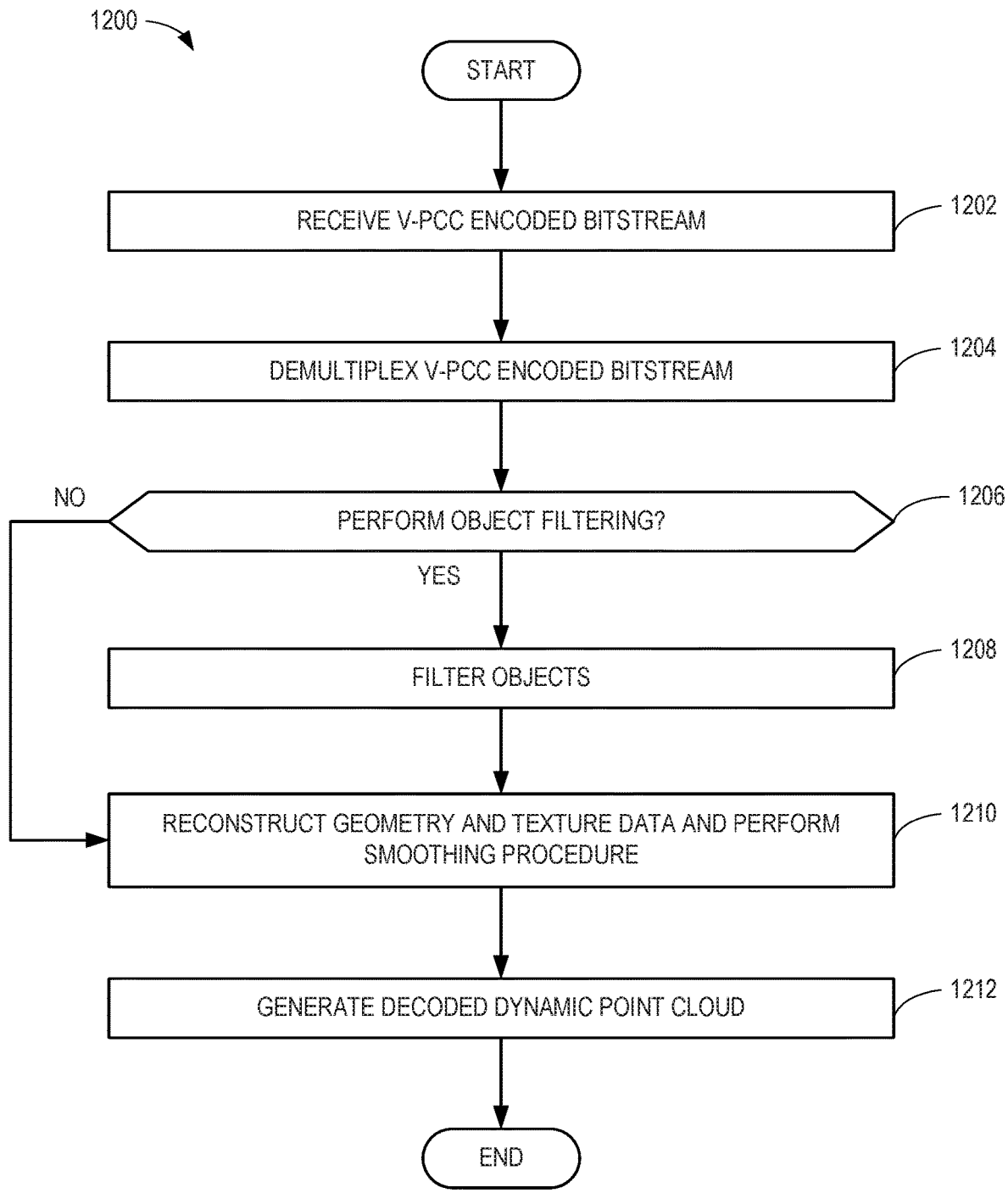
FIG. 12 is a flowchart representative of machine readable instructions which may be executed to implement the V-PCC decoder of FIGS. 4 and/or 6.

A flowchart representative of example hardware logic, machine readable instructions, hardware implemented state machines, and/or any combination thereof for implementing the client side immersive video decoding system 450 of FIG. 4 is shown in FIG. 12. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a FWD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 12, many other methods of implementing the example client side immersive video decoding system 450 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 1100 of FIG. 11 includes block 1102. At block 1102, the example projector 502 (FIG. 5) receives point-cloud representations of objects. For example, the projector 502 receives point-cloud data 500 (FIG. 5) of objects. At block 1104, the example point annotator 501 annotates each input point with an object ID. For example, the point annotator 501 determines if the input points of the point-cloud include object identifiers. If the point annotator 501 determines the input points do not include object identifiers, the point annotator 501 generates and assigns each input of the point-cloud an object identifier using machine learning classifiers, a conventional classifier, and/or a segmentation algorithm. That is, the point annotator 501 assigns each object in the point-cloud a different object ID.

At block 1106, the example projector 502 performs object-based projection. In some examples, the projector 502 iterates through the object IDs to project the point-clouds of each object onto projection planes one object at a time. Additionally or alternatively, the projector 502 projects the point-clouds of each object onto separate projection planes associated with a projection cube corresponding to that single object. In some examples, the example object separator 504 (FIG. 5) separates each projected object into respective projection layers of the projection planes. That is, the object separator 504 generates projection layer pairs of the projection cube for each object.

At block 1108, the example object-based generator 506 (FIG. 5) extracts patches, wherein each patch has pixels belonging to one object. For example, the object-based generator 506 generates a stack of patches in projection layers of the projection plane. That is, the object-based generator 506 generates patches such that each patch corresponds to one object. At block 1110, the example object-based generator 506 assigns an associated object ID to each patch. For example, the object-based generator 506 tags each patch with the corresponding object ID.

At block 1112, the example object-based generator 506 packs patches into atlases and generates patch information. For example, the object-based generator 506 packs patches of one or more objects into atlases. In some examples, the object-based generator 506 generates corresponding patch metadata to map each patch to its position in the atlas.

At block 1114, the example metadata generator 508 (FIG. 5) generates attribute and geometry atlases. For example, the metadata generator 508 generates encoded geometry data. At block 1116, the example bitstream encoder 510 (FIG. 5) encodes and multiplexes video data and metadata into a single bitstream. For example, the bitstream encoder 510 receives the attribute and geometry atlases from the example metadata generator 508 and atlases from the example object-based generator 506. The example bitstream encoder 510 multiplexes the received data and outputs a single bitstream.

FIG. 12 is a flowchart representative of machine readable instructions which may be executed to implement the client player 452 of FIG. 4. At block 1202, the example de-packager 454 (FIG. 4) receives a V-PCC encoded bitstream. For example, the de-packager 454 receives the V-PCC encoded bitstream generated by the example object-based V-PCC encoder 410 (FIG. 4) via the content distribution network 416 (FIG. 4).

At block 1204, the example de-packager 454 demultiplexes the V-PCC encoded bitstream. For example, the de-packager 454 generates substreams (e.g., a video substream, a patch substream, an occupancy map substream, etc.) from the V-PCC encoded bitstream. At block 1206, the example object filter 605 (FIG. 6) determines whether to perform object filtering. For example, the object filter 605 determines whether to remove patches with object IDs corresponding to objects that are not of interest. If, at block 1206, the example object filter 605 determines to perform object filtering, at block 1208, the object filter 605 filters objects. For example, the object filter 605 identifies patches corresponding to the object IDs of the objects to be removed and removes the corresponding patches from the atlas. If, at block 1206, the example object filter 605 determines to not perform object filtering, control proceeds to block 1210.

At block 1210, the example V-PCC decoder 456 (FIG. 4) reconstructs geometry data and performs smoothing. For example, the geometry reconstructor 606 (FIG. 6) reconstructs geometry data based on the patch information and/or the occupancy map. In some examples, the V-PCC decoder 456 reconstructs geometry data corresponding to objects of interest (e.g., patches corresponding to the objects of interest). The example smoother 608 (FIG. 6) performs smoothing based on the reconstructed geometry data. The example texture reconstructor 610 (FIG. 6) reconstructs texture data based on the reconstructed geometry data and the patch information. At block 1212, the example video renderer 462 (FIG. 4) generates a decoded dynamic point cloud.

Figure 13:
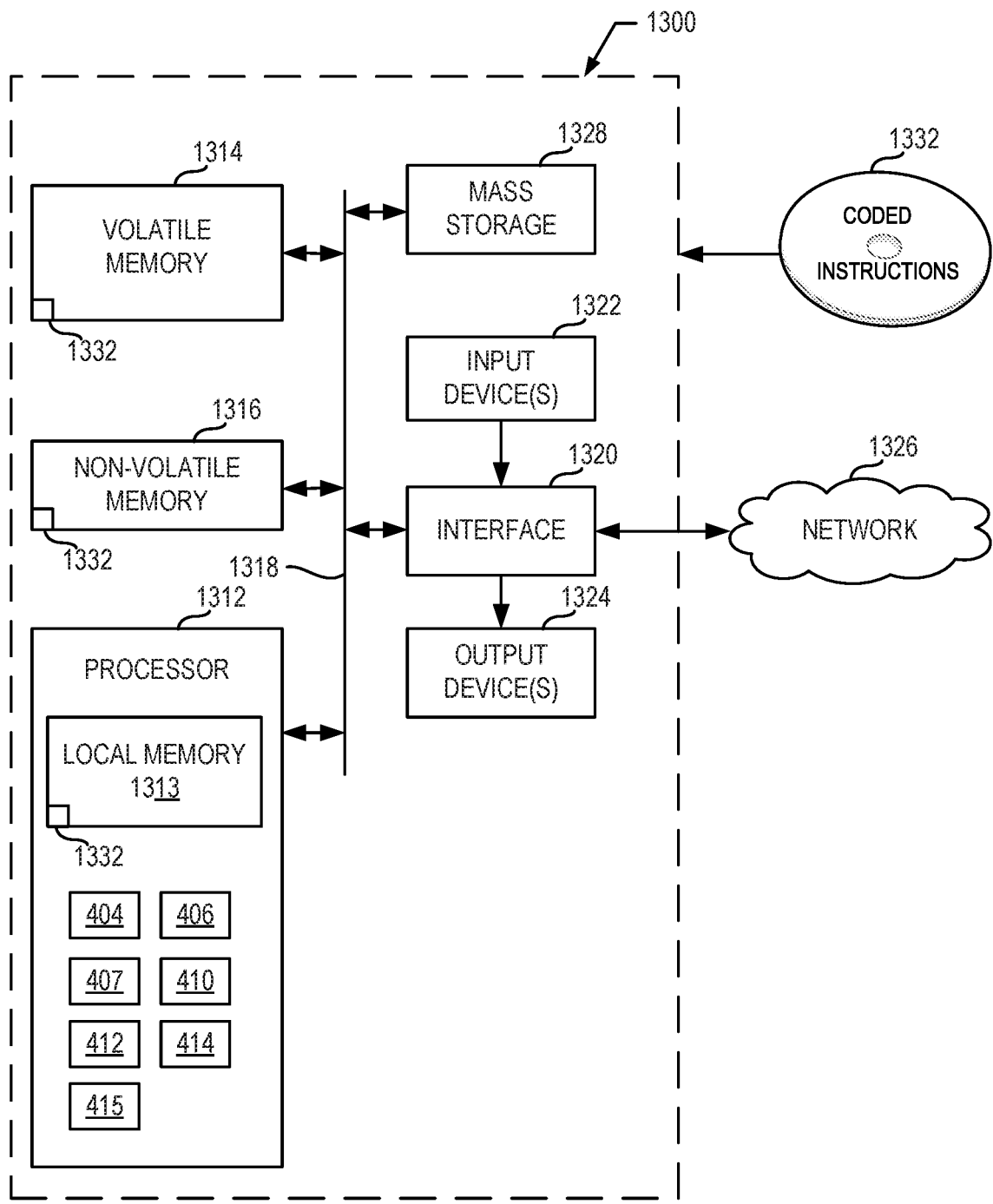
FIG. 13 is a block diagram of an example processing platform structured to execute the instructions of FIG. 11 to implement the object-based V-PCC encoder of FIGS. 4 and/or 5.

FIG. 13 is a block diagram of an example processor platform 1300 structured to execute the instructions of FIG. 11 to implement the server side immersive video encoding system 402 of FIGS. 4 and/or 5. The processor platform 1300 can be, for example, a server, a personal computer, a workstation, a self-learning machine (e.g., a neural network), a mobile device (e.g., a cell phone, a smart phone, a tablet such as an iPad™), personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example video capturer(s) 404, the example point-cloud generator 406, the example virtual camera renderer 407, the example object-based V-PCC encoder 410, the example video encoder 412, the example stream packager 414, and the example content management system 415.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device (s) 1322 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 11 may be stored in the mass storage device 1328, in the volatile memory 1314, in the non-volatile memory 1316, and/or on a removable non-transitory computer readable storage medium such as a CD or DVD.

Figure 14:
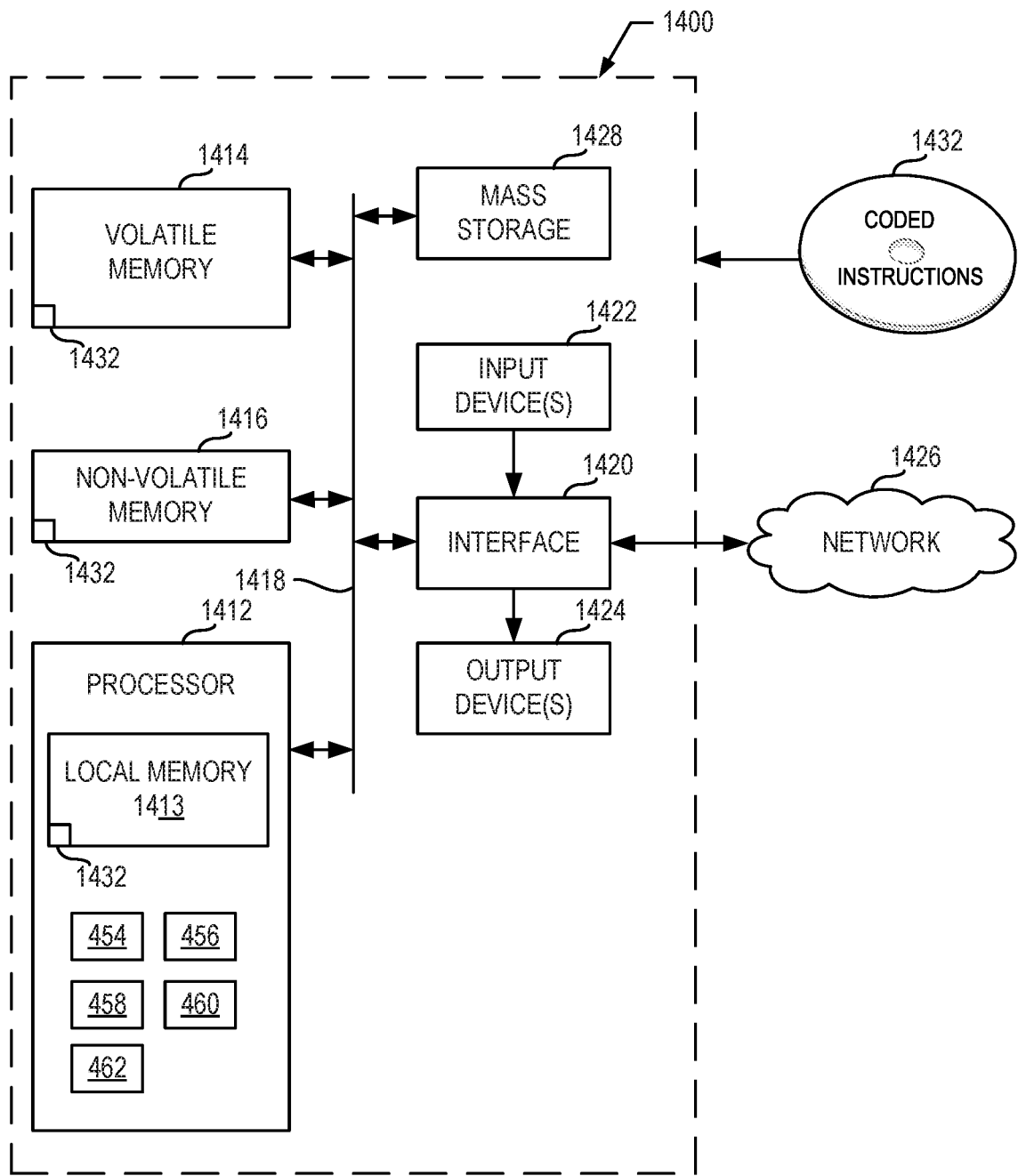
FIG. 14 is a block diagram of an example processing platform structured to execute the instructions of FIG. 12 to implement the V-PCC decoder of FIGS. 4 and/or 6.

FIG. 14 is a block diagram of an example processor platform 1400 structured to execute the instructions of FIG. 12 to implement the client side immersive video decoding system 450 of FIGS. 4 and/or 6. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example de-packager 454, the example V-PCC decoder 456, the example presentation engine 458, the example video decoder 460, and the example video renderer 462.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 12 may be stored in the mass storage device 1428, in the volatile memory 1414, in the non-volatile memory 1416, and/or on a removable non-transitory computer readable storage medium such as a CD or DVD.

Figure 15:
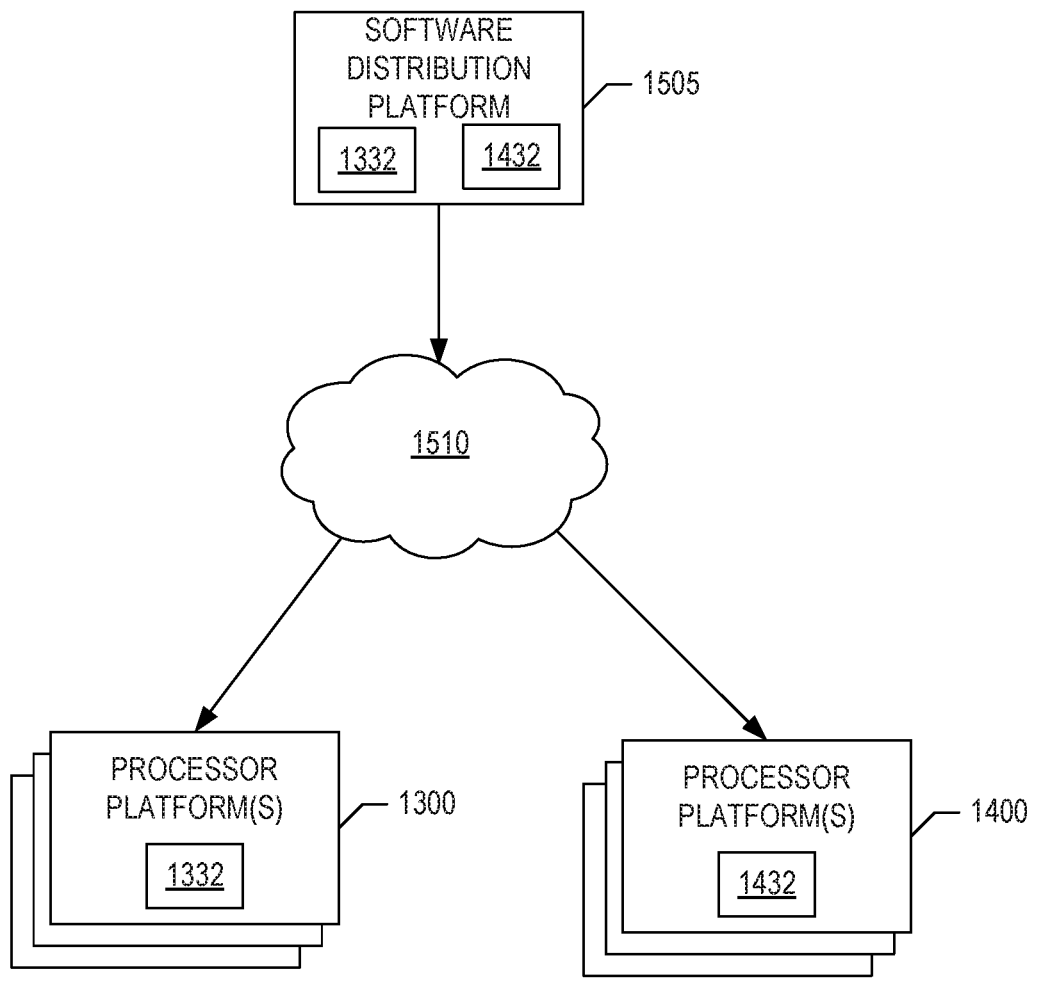
FIG. 15 is a block diagram of an example software distribution platform to distribute software (e.g., software corresponding to the example computer readable instructions of FIGS. 13-14) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1505 to distribute software such as the example computer readable instructions 1332 of FIG. 13 and/or the example computer readable instructions 1432 of FIG. 14 to third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1332 of FIG. 13 and/or the example computer readable instructions 1432 of FIG. 14. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the computer readable instructions 1332 and/or 1432, which may correspond to the example computer readable instructions 1332 of FIG. 13 and/or the example computer readable instructions 1432 of FIG. 14, as described above. The one or more servers of the example software distribution platform 1505 are in communication with a network 1510, which may correspond to any one or more of the Internet and/or any of the example networks 1326, 1426 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1332 and/or 1432 from the software distribution platform 1505. For example, the software, which may correspond to the example computer readable instructions 1332 of FIG. 13, may be downloaded to the example processor platform 1300, which is to execute the computer readable instructions 1432 to implement the server side immersive video encoding system 402. For example, the software, which may correspond to the example computer readable instructions 1432 of FIG. 14, may be downloaded to the example processor platform 1400, which is to execute the computer readable instructions 1432 to implement the client side immersive video decoding system 450. In some example, one or more servers of the software distribution platform 1505 periodically offer, transmit, and/or force updates to the software (e.g., the example computer readable instructions 1332 of FIG. 13 and/or the example computer readable instructions 1432 of FIG. 14) to ensure improvements, patches, updates, etc. are distributed and applied to the software at the end user devices.

From the foregoing, it will be appreciated that example methods, apparatus and articles of manufacture have been disclosed that enable object-based volumetric video coding. The disclosed methods, apparatus and articles of manufacture improve the efficiency of using a computing device by assigning object IDs to objects represented in a video scene. In some examples, an object-based encoder varies the number of bits used to store object IDs based on the total number of objects in a scene. In some examples, the object-based encoder identifies objects of interest and allocates relatively more bandwidth to encode the objects of interest and relatively less bandwidth to background objects, static objects, etc. The disclosed methods, apparatus and articles of manufacture are accordingly directed to one or more improvement(s) in the functioning of a computer.

Example methods, apparatus, systems, and articles of manufacture for object-based volumetric video coding are disclosed herein. Further examples and combinations thereof include the following:

Example 1 includes a video encoder comprising a projector to project point cloud data onto projection planes to produce texture images and geometry images associated with an object, a patch generator to generate a patch based on an object identifier of the object, the patch including at least one of the texture images or the geometry images associated with the object, the patch associated with the object identifier of the object, an atlas generator to generate an atlas to include in encoded video data, the atlas including the patch.

Example 2 includes the encoder of example 1, wherein the projection planes include projection layer pairs.

Example 3 includes the encoder of example 2, wherein the object is a first object, and further including an object separator to generate a first projection layer pair corresponding to the first object and a second projection layer pair corresponding to a second object.

Example 4 includes the encoder of example 3, wherein the object separator is to order the first projection layer pair before the second projection layer pair when the first object is closer to a first one of the projection planes than the second object.

Example 5 includes the encoder of example 1, wherein the object is a first object associated with a first object identifier, the patch is a first patch associated with the first object identifier, and the patch generator is to generate a second patch based on a second object identifier, the second patch including second texture images and second geometry images of a second object, the second patch associated with the second object identifier to identify the second object.

Example 6 includes the encoder of example 5, wherein the patch generator is to stack the first patch and the second patch in a projection layer of a first one of the projection planes, the first patch stacked before the second patch when the first object is closer to the first one of the projection planes than the second object.

Example 7 includes the encoder of example 1, wherein the object is a first object associated with a first object identifier and the projector is to project the point cloud data associated with the first object identifier onto projection planes of a first cube, and project the point cloud data associated with a second object identifier onto projection planes of a second cube, the second object identifier associated with a second object in the point cloud data.

Example 8 includes the encoder of example 7, wherein the first cube has a greater resolution than the second cube, the second cube has a greater resolution than the first cube, or the first cube has the same resolution as the second cube.

Example 9 includes the encoder of example 1, further including a point annotator to receive point cloud data associated with an object and annotate points of the point cloud data with an object identifier of the object.

Example 10 includes the encoder of example 1, wherein the object identifier is a first object identifier, the patch is a first patch, and the patch generator is to generate a second patch associated with a second object identifier at a lower resolution than the first patch, the point cloud data including a second object associated with the second object identifier.

Example 11 includes a non-transitory computer readable medium comprising instructions which, when executed, cause a machine to at least project point cloud data onto projection planes to produce texture images and geometry images associated with an object, generate a patch based on an object identifier of the object, the patch including at least one of the texture images or the geometry images associated with the object, the patch associated with the object identifier of the object, generate an atlas to include in encoded video data, the atlas including the patch.

Example 12 includes the non-transitory computer readable medium of example 11, wherein the projection planes include projection layer pairs.

Example 13 includes the non-transitory computer readable medium of example 12, wherein the object is a first object, and the instructions cause the machine to generate a first projection layer pair corresponding to the first object and a second projection layer pair corresponding to a second object.

Example 14 includes the non-transitory computer readable medium of example 13, wherein the instructions cause the machine to order the first projection layer pair before the second projection layer pair when the first object is closer to a first one of the projections planes than the second object.

Example 15 includes the non-transitory computer readable medium of example 11, wherein the object is a first object associated with a first object identifier, the patch is a first patch associated with the first object identifier and the instructions cause the machine to generate a second patch based on a second object identifier, the second patch including second texture images and second geometry images of a second object, the second patch associated with the second object identifier to identify the second object.

Example 16 includes the non-transitory computer readable medium of example 15, wherein the instructions cause the machine to stack the first patch and the second patch in a projection layer of a first one of the projection planes, the first patch stacked before the second patch when the first object is closer to the first one of the projection planes than the second object.

Example 17 includes the non-transitory computer readable medium of example 11, wherein the object is a first object associated with a first object identifier and the instructions cause the machine to project the point cloud data associated with the first object identifier onto projection planes of a first cube, and project the point cloud data associated with a second object identifier onto projection planes of a second cube, the second object identifier associated with a second object in the point cloud data.

Example 18 includes the non-transitory computer readable medium of example 17, wherein the first cube has a greater resolution than the second cube, the second cube has a greater resolution than the first cube, or the first cube has the same resolution as the second cube.

Example 19 includes the non-transitory computer readable medium of example 11, wherein the instructions cause the machine to receive point cloud data associated with an object and annotate points of the point cloud data with an object identifier of the object.

Example 20 includes the non-transitory computer readable medium of example 11, wherein the object identifier is a first object identifier, the patch is a first patch, and the instructions cause the machine to generate a second patch associated with a second object identifier at a lower resolution than the first patch, the point cloud data including a second object associated with the second object identifier.

Example 21 includes a method comprising projecting point cloud data onto projection planes to produce texture images and geometry images associated with an object, generating a patch based on an object identifier of the object, the patch including at least one of the texture images or the geometry images associated with the object, the patch associated with the object identifier of the object, generating an atlas to include in encoded video data, the atlas including the patch.

Example 22 includes the method of example 21, wherein the projection planes include projection layer pairs.

Example 23 includes the method of example 22, wherein the object is a first object, and further including generating a first projection layer pair corresponding to the first object and a second projection layer pair corresponding to a second object.

Example 24 includes the method of example 23, further including ordering the first projection layer pair before the second projection layer pair when the first object is closer to a first one of the projection planes than the second object.

Example 25 includes the method of example 21, wherein the object is a first object associated with a first object identifier, the patch is a first patch associated with the first object identifier and further including generating a second patch based on a second object identifier, the second patch including second texture images and second geometry images of a second object, the second patch associated with the second object identifier to identify the second object.

Example 26 includes the method of example 25, further including stacking the first patch and the second patch in a projection layer of a first one of the projection planes, the first patch stacked before the second patch when the first object is closer to the first one of the projection planes than the second object.

Example 27 includes the method of example 21, wherein the object is a first object associated with a first object identifier and further including projecting the point cloud data associated with the first object identifier onto projection planes of a first cube, and projecting the point cloud data associated with a second object identifier onto projection planes of a second cube, the second object identifier associated with a second object in the point cloud data.

Example 28 includes the method of example 27, wherein the first cube has a greater resolution than the second cube, the second cube has a greater resolution than the first cube, or the first cube has the same resolution as the second cube.

Example 29 includes the method of example 21, further including receiving point cloud data associated with an object and annotate points of the point cloud data with an object identifier of the object.

Example 30 includes the method of example 21, wherein the object identifier is a first object identifier, the patch is a first patch, and further including generating a second patch associated with a second object identifier at a lower resolution than the first patch, the point cloud data including a second object associated with the second object identifier.

Example 31 includes a decoder comprising a bitstream decoder to receive an encoded bitstream and generate a decoded bitstream including texture data, geometry data, occupancy map data, atlas and parameter metadata, and patch data, an object filter to select a patch associated with an object identifier from the patch data to generate filtered patch data, the patch including texture data and geometry data associated with the object, and a reconstructor to generate a point cloud based on the filtered patch data.

Example 32 includes the decoder of example 31, wherein the object identifier is a first object identifier, the decoded bitstream includes a bounding box associated with a second object identifier and the reconstructor is to generate the point cloud based on the patch data included in the bounding box.

Example 33 includes the decoder of example 31, wherein the object is a first object, the object identifier is a first object identifier, the patch a first patch, the encoded bitstream includes a second patch associated with a second object identifier of a second object, and the filtered patch data includes the second patch.

Example 34 includes the decoder of example 33, wherein the point cloud is a first point cloud, and the object filter is to replace the second patch associated with the second object identifier with at least one of a second point cloud or projection.

Example 35 includes the decoder of example 34, wherein the decoded bitstream includes a third object associated with a third object identifier and the reconstructor is to generate a third point cloud based on the patch data associated with the third object identifier once per frame.

Example 36 includes the decoder of example 35, wherein the reconstructor is to generate the third point cloud before the second point cloud.

Example 37 includes the decoder of example 31, wherein the atlas and parameter metadata includes the object identifier associated with the patch.

Example 38 includes the decoder of example 31, wherein the encoded bitstream includes a supplemental enhancement information (SET) message, the SET message including the object identifier associated with the patch.

Example 39 includes a non-transitory computer readable medium comprising instructions which, when executed, cause a machine to at least receive an encoded bitstream, generate a decoded bitstream including texture data, geometry data, occupancy map data, atlas and parameter metadata, and patch data, select a patch associated with an object identifier from the patch data to generate filtered patch data, the patch including texture data and geometry data associated with the object, and generate a point cloud based on the filtered patch data.

Example 40 includes the non-transitory computer readable medium of example 39 wherein the object identifier is a first object identifier, the decoded bitstream includes a bounding box associated with a second object identifier and the instructions cause the machine to generate the point cloud based on the patch data included in the bounding box.

Example 41 includes the non-transitory computer readable medium of example 39, wherein the object is a first object, the object identifier is a first object identifier, the patch a first patch, the encoded bitstream includes a second patch associated with a second object identifier of a second object, and the filtered patch data includes the second patch.

Example 42 includes the non-transitory computer readable medium of example 41, wherein the point cloud is a first point cloud, and the instructions cause the machine to replace the second patch associated with the second object identifier with at least one of a second point cloud or projection.

Example 43 includes the non-transitory computer readable medium of example 42, wherein the decoded bitstream includes a third object associated with a third object identifier and the instructions cause the machine to generate a third point cloud based on the patch data associated with the third object identifier once per frame.

Example 44 includes the non-transitory computer readable medium of example 43, wherein the instructions cause the machine to generate the third point cloud before the second point cloud.

Example 45 includes the non-transitory computer readable medium of example 39, wherein the atlas and parameter metadata includes the object identifier associated with the patch.

Example 46 includes the non-transitory computer readable medium of example 39, wherein the encoded bitstream includes a supplemental enhancement information (SEI) message, the SF1 message including the object identifier associated with the patch.

Example 47 includes a method comprising receiving an encoded bitstream, generating a decoded bitstream including texture data, geometry data, occupancy map data, atlas and parameter metadata, and patch data, selecting a patch associated with an object identifier from the patch data to generate filtered patch data, the patch including texture data and geometry data associated with the object, and generating a point cloud based on the filtered patch data.

Example 48 includes the method of example 47, wherein the object identifier is a first object identifier, the decoded bitstream includes a bounding box associated with a second object identifier and further including generating the point cloud based on the patch data included in the bounding box.

Example 49 includes the method of example 47, wherein the object is a first object, the object identifier is a first object identifier, the patch a first patch, the encoded bitstream includes a second patch associated with a second object identifier of a second object, and the filtered patch data includes the second patch.

Example 50 includes the method of example 49, wherein the point cloud is a first point cloud, and further including replacing the second patch associated with the second object identifier with at least one of a second point cloud or projection.

Example 51 includes the method of example 50, wherein the decoded bitstream includes a third object associated with a third object identifier and further including generating a third point cloud based on the patch data associated with the third object identifier once per frame.

Example 52 includes the method of example 51, further including generating the third point cloud before the second point cloud.

Example 53 includes the method of example 47, wherein the atlas and parameter metadata includes the object identifier associated with the patch.

Example 54 includes the method of example 47, wherein the encoded bitstream includes a supplemental enhancement information (SEI) message, the SEI message including the object identifier associated with the patch.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A video encoder comprising:
interface circuitry;
instructions; and
at least one processor circuit to be programmed by the instructions to:
project first point cloud data associated with a first object identifier onto a first pair of projection layers of a projection plane, the first pair of projection layers to be tagged with the first object identifier to associate the first pair of projection layers with a first object;
project second point cloud data associated with a second object identifier onto a second pair of projection layers of the projection plane, the second pair of projection layers different from the first pair of projection layers, the second object identifier different from the first object identifier, the second pair of projection layers to be tagged with the second object identifier to associate the second pair of projection layers with a second object different than the first object;
generate a patch based on at least one projection layer of the first pair of projection layers, the patch associated with the first object identifier of the first object; and
generate an atlas to include in encoded video data, the atlas including the patch.

2. The video encoder of claim 1, wherein the projection plane is a first projection plane, and one or more of the at least one processor circuit is to:
project the first point cloud data associated with the first object identifier onto a third pair of projection layers assigned to the first object, the third pair of projection layers associated with a second projection plane; and
project the second point cloud data associated with the second object identifier onto a fourth pair of projection layers assigned to the second object, the fourth pair of projection layers associated with the second projection plane.

3. The video encoder of claim 1, wherein the first pair of projection layers includes a first near layer and a first far layer assigned to the first object, and the second pair of projection layers includes a second near layer and a second far layer assigned to the second object, the second near layer different from the first near layer, and the second far layer different from the first far layer.

4. The video encoder of claim 1, wherein one or more of the at least one processor circuit is to order the first pair of projection layers before the second pair of projection layers when the first object is closer to the projection plane than the second object.

5. The video encoder of claim 1, wherein the patch is a first patch associated with the first object identifier, and one or more of the at least one processor circuit is to generate a second patch based on at least one projection layer of the second pair of projection layers, the second patch associated with the second object identifier.

6. The video encoder of claim 5, wherein one or more of the at least one processor circuit is to stack the first patch before the second patch when the first object is closer to the projection plane than the second object.

7. The video encoder of claim 1, wherein one or more of the at least one processor circuit is to annotate points of the first point cloud data with the first object identifier and annotate points of the second point cloud data with the second object identifier.

8. The video encoder of claim 1, wherein the patch is a first patch, and one or more of the at least one processor circuit is to generate a second patch associated with the second object identifier, the second patch at a lower resolution than the first patch.

9. At least one non-transitory computer readable medium comprising instructions to cause at least one processor circuit to at least:

project first point cloud data associated with a first object identifier onto a first pair of projection layers of a projection plane, the first pair of projection layers to be tagged with the first object identifier to associate the first pair of projection layers with a first object;

project second point cloud data associated with a second object identifier onto a second pair of projection layers of the projection plane, the second pair of projection layers different from the first pair of projection layers, the second object identifier different from the first object identifier, the second pair of projection layers to be tagged with the second object identifier to associate the second pair of projection layers with a second object different than the first object;

generate a patch based on at least one projection layer of the first pair of projection layers, the patch associated with the first object identifier of the first object; and generate an atlas to include in encoded video data, the atlas including the patch.

10. The at least one non-transitory computer readable medium of claim 9, wherein the projection plane is a first projection plane, and the instructions are to cause one or more of the at least one processor circuit to:

project the first point cloud data associated with the first object identifier onto a third pair of projection layers assigned to the first object, the third pair of projection layers associated with a second projection plane; and project the second point cloud data associated with the second object identifier onto a fourth pair of projection layers assigned to the second object, the fourth pair of projection layers associated with the second projection plane.

11. The at least one non-transitory computer readable medium of claim 9, wherein the first pair of projection layers includes a first near layer and a first far layer assigned to the first object, and the second pair of projection layers includes a second near layer and a second far layer assigned to the second object, the second near layer different from the first near layer, and the second far layer different from the first far layer.

12. The at least one non-transitory computer readable medium of claim 9, wherein the instructions are to cause one or more of the at least one processor circuit to order the first pair of projection layers before the second pair of projection layers when the first object is closer to the projections plane than the second object.

13. The at least one non-transitory computer readable medium of claim 9, wherein the patch is a first patch associated with the first object identifier, and the instructions are to cause one or more of the at least one processor circuit to generate a second patch based on at least one projection layer of the second pair of projection layers, the second patch associated with the second object identifier.

14. The at least one non-transitory computer readable medium of claim 13, wherein the instructions are to cause one or more of the at least one processor circuit to stack the first patch before the second patch when the first object is closer to the projection plane than the second object.

15. A video encoding method comprising:

projecting, by at least one processor circuit programmed by at least one instruction, a first portion of point cloud data associated with an object onto a first pair of projection layers assigned to the object, the first pair of projection layers associated with a first one of a plurality of projection planes, the first pair of projection layers tagged with an identifier of the object to associate the first pair of projection layers with a first object;

projecting, by one or more of the at least one processor circuit, a second portion of point cloud data associated with a background onto a second pair of projection layers assigned to the background, the second pair of projection layers associated with the first one of the projection planes, the second pair of projection layers tagged with an identifier of the background to associate the second pair of projection layers with the background;

generating a first patch based on the first pair of projection layers and a second patch based on the second pair of projection layers; and generating encoded video data based on the first patch and the second patch.

16. The method of claim 15, further including:

projecting the first portion of the point cloud data onto a third pair of projection layers assigned to the object, the third pair of projection layers associated with a second one of the projection planes; and projecting the second portion of the point cloud data onto a fourth pair of projection layers assigned to the background, the fourth pair of projection layers associated with the second one of the projection planes.

17. The method of claim 15, wherein the first pair of projection layers includes a first near layer and a first far layer assigned to the object, and the second pair of projection layers includes a second near layer and a second far layer assigned to the background, the second near layer different from the first near layer, and the second far layer different from the first far layer.

18. The method of claim 15, further including ordering the first pair of projection layers before the second pair of projection layers.

19. The method of claim 15, further including annotating points of the first portion of the point cloud data with the identifier of the object.

20. The method of claim 15, further including stacking the first patch before the second patch.

* * * * *